US012654869B2

(12) United States Patent
Kobayashi et al.

(10) Patent No.: US 12,654,869 B2
(45) Date of Patent: Jun. 16, 2026

(54) ELECTRIC AIRCRAFT AND ATTITUDE CONTROL METHOD THEREFOR

(71) Applicant: JAPAN AEROSPACE EXPLORATION AGENCY, Tokyo (JP)

(72) Inventors: Hiroshi Kobayashi, Tokyo (JP); Mari Nishiyama, Tokyo (JP); Akira Nishizawa, Tokyo (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 666 days.

(21) Appl. No.: 17/754,505

(22) PCT Filed: Jul. 29, 2020

(86) PCT No.: PCT/JP2020/029062
§ 371 (c)(1),
(2) Date: Apr. 4, 2022

(87) PCT Pub. No.: WO2021/065179
PCT Pub. Date: Apr. 8, 2021

(65) Prior Publication Data
US 2025/0269974 A1     Aug. 28, 2025

(30) Foreign Application Priority Data

Oct. 4, 2019     (JP) ................................. 2019-183378

(51) Int. Cl.
*B64D 31/00*          (2024.01)
*B64D 27/30*          (2024.01)
(Continued)

(52) U.S. Cl.
CPC .............. *B64D 31/00* (2013.01); *B64D 27/30* (2024.01); *B64D 27/34* (2024.01); *B64D 31/16* (2024.01); *Y02T 50/60* (2013.01)

(58) Field of Classification Search
CPC ........ B64D 31/16; B64D 27/34; B64D 35/04; B64D 35/08; G05D 1/49; G05D 2109/20
See application file for complete search history.

(56) References Cited

U.S. PATENT DOCUMENTS

| | | | |
|---|---|---|---|
| 2003/0094537 A1 | 5/2003 | Austen-Brown | |
| 2011/0186679 A1 | 8/2011 | Reckzeh | |

(Continued)

FOREIGN PATENT DOCUMENTS

| | | |
|---|---|---|
| JP | 2011-527253 A | 10/2011 |
| JP | 2014-172435 A | 9/2014 |

(Continued)

OTHER PUBLICATIONS

Ikegami, T., et al., "Fundamental Study on Vertical and Longitudinal Force Control for Electric Airplane with Multiple Propellers," IEEJ International Workshop on Sensing, Actuation, and Motion Control, 2016, pp. 1-6 (Year: 2016).*

(Continued)

*Primary Examiner* — Kito R Robinson
*Assistant Examiner* — Zachary E. F. Glade
(74) *Attorney, Agent, or Firm* — SALIWANCHIK, LLOYD & EISENSCHENK

(57) ABSTRACT

Provided are an electric aircraft and an attitude control method therefor that are capable of generating an aerodynamic force in just proportions without impairing fuel consumption performance. In an electric aircraft, an electric propulsion system including a propeller for propulsion and an electric motor that drives the propeller for propulsion is disposed at a leading edge of a wing such that the slipstream (Continued)

generated by the electric propulsion system acts on the wing. A controller is capable of adjusting a thrust of the electric propulsion system to a negative value.

14 Claims, 22 Drawing Sheets

(51) Int. Cl.
  B64D 27/34 (2024.01)
  B64D 31/16 (2024.01)

(56) References Cited

U.S. PATENT DOCUMENTS

| | | | |
|---|---|---|---|
| 2013/0092799 A1 | 4/2013 | Tian et al. | |
| 2014/0257599 A1 | 9/2014 | Kobayashi et al. | |
| 2016/0355272 A1* | 12/2016 | Moxon | B64D 27/31 |
| 2017/0203839 A1 | 7/2017 | Giannini et al. | |
| 2018/0127104 A1* | 5/2018 | Kobayashi | B64D 27/351 |
| 2019/0061901 A1 | 2/2019 | Long | |
| 2019/0135425 A1 | 5/2019 | Moore et al. | |
| 2019/0337612 A1* | 11/2019 | Carter, Jr. | B64C 29/0025 |
| 2020/0307390 A1* | 10/2020 | Clark | B60L 3/12 |

FOREIGN PATENT DOCUMENTS

| | | |
|---|---|---|
| JP | 2014-528382 A | 10/2014 |
| JP | 2018-47905 A | 3/2018 |
| JP | 2019-501830 A | 1/2019 |
| WO | 2018/193522 A1 | 10/2018 |

OTHER PUBLICATIONS

Unmanned Airplane for Radiation Monitoring Systems (UARMS). Datasheet [online]. Japanese Aerospace Exploration Agency, 2013 [Retrieved on Feb. 10, 2022. Retrieved from the Internet: , URL= https://www.aero.jaxa.jp/research/star/uas/uarms/>, provided within the IDS sent May 27, 2022 (Year: 2013).*

Office Action dated May 18, 2023 in Japanese Application No. 2019-183378.

International Search Report dated Oct. 27, 2020 in International Application No. PCT/JP2020/029062.

Ikegami, T., et al., "Fundamental Study on Vertical and Longitudinal Force Control for Electric Airplane with Multiple Propellers," IEEJ International Workshop on Sensing, Actuation, and Motion Control, 2016, pp. 1-6.

Konishi, N., et al., "Lift Control of Electric Airplanes by Using Propeller Slipstream for Safe Landing," IEEE International Conference on Mechatronics (ICM), 2015, pp. 1-6.

Sato, M., et al., "Initial Acceleration Suppression via Gust Alleviation Controller Using Prior Gust Information," Journal of the Japan Society for Aeronautical and Space Sciences, 2008, 56(655):355-362.

Torizaki, T., et al., "FJR710 engine and STOL experimental aircraft "Asuka"", Turbomachinery, 1986, 14(3):138-144, Jul. 11, 2011 <URL:https://www.jstage.jst.go.jp/article/tsj1973/14/3/14_3_138/_pdf>.

Unmanned Airplane for Radiation Monitoring System (UARMS). Datasheet [online]. Japan Aerospace Exploration Agency, 2013 [retrieved on Feb. 10, 2022. Retrieved from the Internet: <URL:https://www.aero.jaxa.jp/research/star/uas/uarms/>.

Office Action dated Jan. 19, 2023 in Japanese Application No. 2019-183378.

* cited by examiner

Table 1

| | T_A | T_B | T_C |
|---|---|---|---|
| Roll axis | ◎ | △ | |
| Pitch axis | ○ | ○ | ◎ |
| Yaw axis | ○ | ◎ | |
| Thrust axis | ○ | ○ | ◎ |
| Lift axis | ◎ | △ | △ |

Blank : Almost no impact
△ : A minor level of impact
○: A moderate level of impact
◎: A significant level of impact

FIG.18

Table 2

| | △Tc_A | Σ Tc_A | △Tc_B | Σ Tc_B | Tc_C |
|---|---|---|---|---|---|
| Roll axis | ◎ | | △ | | |
| Pitch axis | | ○ | | ○ | ◎ |
| Yaw axis | ○ | | ◎ | | |
| Thrust axis | | ○ | | ○ | ◎ |
| Lift axis | | ◎ | | △ | △ |

Blank : Almost no impact
△ : A minor level of impact
○: A moderate level of impact
◎: A significant level of impact

FIG.19

Wind gust

⊂⊃ Propulsion    ━●━ Regeneration

Area where dynamic pressure increases    Area where dynamic pressure decreases

Area where dynamic pressure increases

Area where dynamic pressure decreases

ELECTRIC AIRCRAFT AND ATTITUDE CONTROL METHOD THEREFOR

CROSS-REFERENCE TO RELATED APPLICATIONS

This application is the U.S. national stage application of International Patent Application No. PCT/JP2020/029062, filed Jul. 29, 2020, which claims the benefit under 35 U.S.C. § 119 of Japanese Application No. 2019-183378, filed Oct. 4, 2019, the disclosures of each of which are incorporated herein by reference in their entirety.

TECHNICAL FIELD

The present invention relates to an electric aircraft using an electric propulsion system driven by an electric motor and to an attitude control method for the electric aircraft.

BACKGROUND ART

Although an automated and autonomous operation is effective to improve the safety of aircraft, an automation method of driving and controlling conventional aerodynamic devices such as an aileron and an elevator by using actuators requires enormous costs, thus making it difficult to apply such a method to small aircraft with a high accident rate. This is because the redundancy of all systems of an attitude control system including actuators and control computers is essential in order to avoid the risks of crashes caused by single malfunctions of the actuators, the control computers, and the like.

As means for generating an aerodynamic force required for the attitude control of the aircraft by a method different from a combination of the aerodynamic devices and actuators, a technique of causing a slipstream accelerated by a propeller or the like to act on a wing and increasing lift is known (Non-Patent Literature 1).

Note that the technique of applying the increased lift to aircraft control has been reported as known technologies relating to the present invention (Non-Patent Literatures 2 and 3). Further, Non-Patent Literature 4 discloses the use of an existing control surface to be operated for the purpose of reducing the load of a main wing that has been subjected to wind gust. Furthermore, Patent Literature 1 and Non-Patent Literature 5 are disclosed as known technologies relating to the present invention.

CITATION LIST

Patent Literature

Patent Literature 1: Japanese Patent Application Laid-open No. 2014-172435

Non-Patent Literature

Non-Patent Literature 1: https://www.jstage.jst.go.jp/article/tsj1973/14/3/14_3_138/_pdf
Non-Patent Literature 2: http://hflab.k.u-tokyo.ac.jp/papers/2016/samcon_ikegami.pdf
Non-Patent Literature 3: http://hflab.k.u-tokyo.ac.jp/papers/2015/ICM2015_konishi.pdf
Non-Patent Literature 4: Journal of the Japan Society for Aeronautical and Space Sciences Vol. 56, No. 655, pp. 355-362, 2008

Non-Patent Literature 5: http://www.aero.jaxa.jp/research/star/uas/uarms/

DISCLOSURE OF INVENTION

Technical Problem

However, to generate a sufficient aerodynamic force by the technique of causing the slipstream accelerated by the propeller or the like to act on the wing and increasing the lift, there have been problems that the energy input to the propeller or the like becomes excessively larger than the value required for normal flight, the fuel consumption performance is impaired, and an unintentional aerodynamic force resulting from the thrust or the like generated at the same time is also generated. In addition, since the above-mentioned technique and the operation of the existing control surface lead to a change in the lift of the entire main wing, it has been impossible to change the "distribution" of the lift of the main wing so as to protect the main wing structure when subjected to wind gust.

In view of the circumstances as described above, it is an object of the present invention to provide an electric aircraft and an attitude control method therefor that are capable of generating an aerodynamic force in just proportions without impairing fuel consumption performance.

Solution to Problem

To achieve the above object, an electric aircraft according to the present invention includes: a first electric propulsion system including a first propeller or fan for propulsion and a first electric motor that drives the first propeller or fan; and a controller capable of adjusting a thrust of the first electric propulsion system to a negative value.

An attitude control method for an electric aircraft according to the present invention includes: driving a propeller or fan for propulsion by using an electric motor; and adjusting a thrust generated by an electric propulsion system to a negative value, the electric propulsion system including the propeller or fan for propulsion and the electric motor.

In the present invention, the thrust of the propeller or fan can be adjusted to a negative value, so that an aerodynamic force that replaces conventional aerodynamic devices can be efficiently generated, and the aerodynamic force can be generated in just proportions without impairing fuel consumption performance.

In the present invention, the electric propulsion system driven by the electric motor, in which the distributed propulsion system in large numbers is easy to perform, is used, so that a conventional control system can be replaced or backed up while maintaining low cost and high reliability.

An electric aircraft according to an embodiment of the present invention includes: a first electric propulsion system including a first propeller or fan for propulsion and a first electric motor that drives the first propeller or fan, the first electric propulsion system being disposed at a front of a wing to contribute to a lift of at least one of a main wing and a tail wing or to increase or decrease a dynamic pressure of a slipstream of the propulsion system, which acts on the wing; and a controller capable of adjusting a thrust of the first electric propulsion system to a negative value or adjusting it until the first propeller or fan is regenerated or reversed.

In the electric aircraft according to an embodiment of the present invention, an electric propulsion system including a propeller or fan in a main wing or a tail wing is installed to allow a thrust of the propeller or fan to be adjusted to a negative value, that is, to increase or decrease a dynamic pressure of a slipstream of a propulsion system, which acts on the wing, by using in combination of the regeneration and reverse functions by the propulsion system, so that an aerodynamic force that replaces conventional aerodynamic devices is efficiently generated. This makes it possible to generate the aerodynamic force in just proportions without impairing fuel consumption performance.

The electric aircraft according to an embodiment of the present invention includes main wings provided on right and left with respect to an axis of the aircraft, in which one or two or more of the first electric propulsion system are disposed at a front of each of the main wings to contribute to a lift of each of the main wings, and the controller adjusts the thrust of the first electric propulsion system disposed on one of the right and left main wings to a positive value and the thrust of the first electric propulsion system disposed on the other one of the right and left main wings to a negative value, or adjusts the thrust of the first electric propulsion system disposed on each of the right and left main wings to a negative value.

The electric aircraft according to an embodiment of the present invention includes two or more of the first electric propulsion system are disposed at a front of each of the main wings to contribute to a lift of each of the main wings, and the controller adjusts the thrusts of the two or more of the first electric propulsion system disposed on at least one of the right and left main wings to positive or negative values opposite to each other.

The electric aircraft according to an embodiment of the present invention further includes a second electric propulsion system disposed at a rear of each of the right and left main wings and at a position on which a slipstream of the first propeller or fan acts, the second electric propulsion system including a second propeller or fan, and a second electric motor that drives each of the second propellers or fans.

In the electric aircraft according to an embodiment of the present invention, the controller rotates each of the second propellers or fans in a direction in which an inboard side of each of the main wings is raised, and adjusts an operating state of the second electric propulsion system in response to an operating state of the first electric propulsion system.

The electric aircraft according to an embodiment of the present invention includes one or two or more electric propulsion systems including the first electric propulsion system disposed at a front of a wing to contribute to a lift of the wing, in which the controller adjusts the electric propulsion system such that a relationship between a variable relating to an operating state of the electric propulsion system and an aerodynamic force generated on the wing maintains a linear range.

In the electric aircraft according to an embodiment of the present invention, the first electric propulsion system is disposed at a front of a wing to contribute to a lift of the wing, and when a variable relating to an operating state of the first electric propulsion system or an airflow state changes, the controller adjusts the electric propulsion system on the basis of a relationship between the variable relating to the operating state of the electric propulsion system and an aerodynamic force generated on the wing such that a total thrust by the electric propulsion systems or the aerodynamic force has a predetermined value or falls within a predetermined range.

The electric aircraft according to an embodiment of the present invention includes a storage device that stores a data group of a relationship between a variable relating to an operating state of the first electric propulsion system and an aerodynamic force generated on the wing, in which the controller adjusts the first electric propulsion system on the basis of the relationship between the variable relating to the operating state of the first electric propulsion system and the aerodynamic force generated on the wing.

In the electric aircraft according to an embodiment of the present invention, the controller learns, as training data, one or more of a rotation speed, an output, a thrust, or a pitch angle of the first propeller, a motor torque of the first electric motor, a current, a voltage, a lift of the wing, or processing information thereof, obtains a relationship between a variable relating to an operating state of the first electric propulsion system and an aerodynamic force generated on the wing from information relating to the rotation speed of the first propeller, a motor output or the motor torque of the first electric motor, or the processing information thereof, and adjusts the electric propulsion system on the basis of the obtained information.

The electric aircraft according to an embodiment of the present invention includes: main wings provided on right and left with respect to an axis of the aircraft; and a third electric propulsion system disposed in a slipstream of an aircraft structure, the third electric propulsion system including a third propeller or fan and a third electric motor that drives the third propeller or fan, in which the first electric propulsion system is disposed at a front of each of the main wings to contribute to a lift of each of the main wings, and a thrust axis of the first electric propulsion system and a thrust axis of the third electric propulsion system are opposite to each other in a perpendicular direction with respect to the center of gravity of the aircraft.

The electric aircraft according to an embodiment of the present invention further includes a tail wing disposed at a position on which the slipstream of the third propeller or fan acts.

In the electric aircraft according to an embodiment of the present invention, a position of a thrust axis of the third propeller or fan in the perpendicular direction with respect to the center of gravity of the aircraft is in a direction identical to a direction of the lift generated by the tail wing.

In the electric aircraft according to an embodiment of the present invention, the thrust axis of the third propeller or fan is in a direction closer to the lift generated by the tail wing than the tail wing.

Advantageous Effects of Invention

According to the present invention, it is possible to generate an aerodynamic force in just proportions without impairing fuel consumption performance.

BRIEF DESCRIPTION OF DRAWINGS

FIG. 18 is a table 1 showing the degree of influence of an operating state of a propulsion system according to the fourth embodiment of the present invention on each axial motion.

FIG. 19 is a table 2 showing the degree of influence of the operating state of the propulsion system according to the fourth embodiment of the present invention on each axial motion.

MODE(S) FOR CARRYING OUT THE INVENTION

Hereinafter, embodiments of the present invention will be described with reference to the drawings.

First Embodiment

Figure 1:
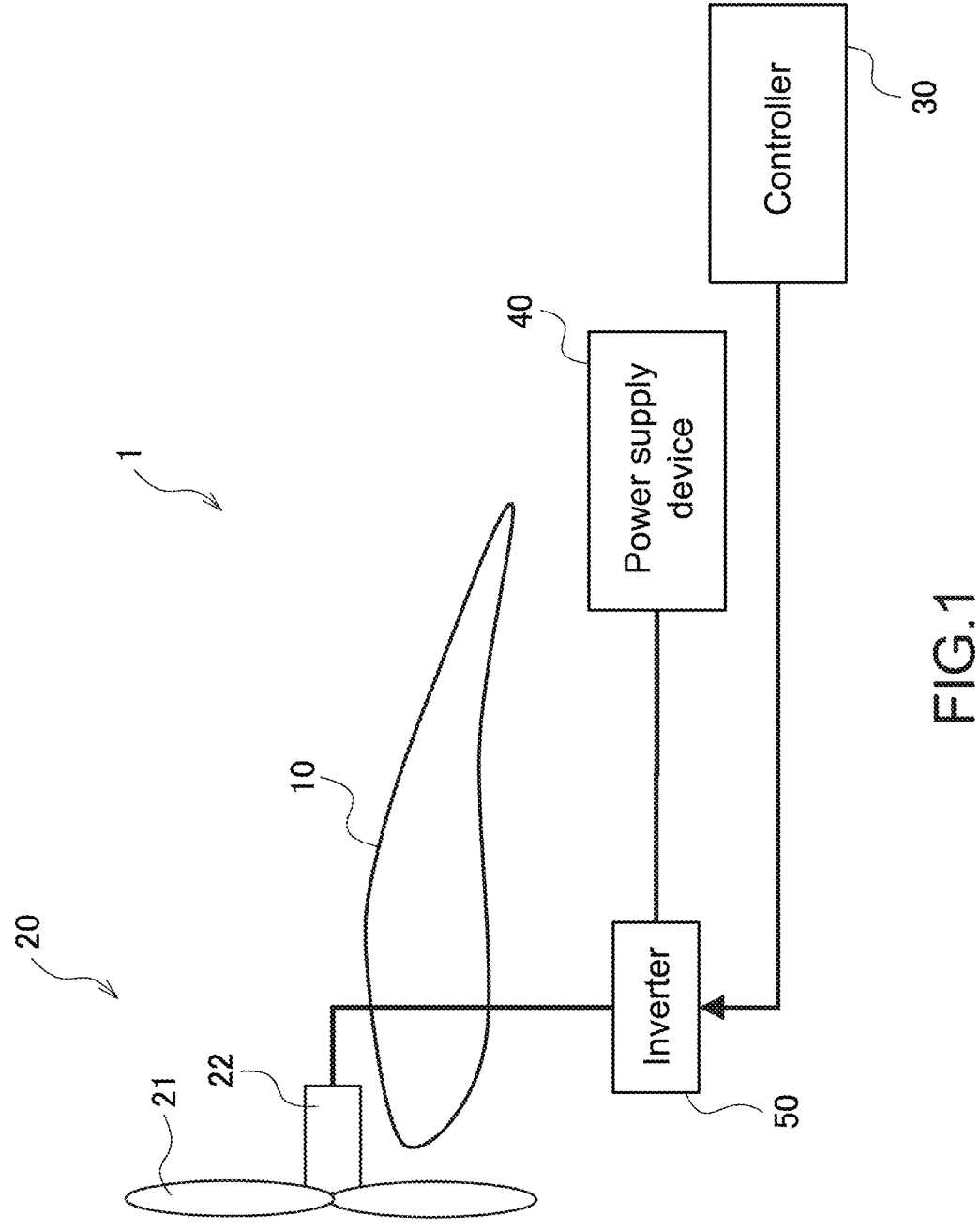
FIG. 1 is a diagram showing a configuration of an electric aircraft according to a first embodiment of the present invention.

FIG. 1 is a diagram showing a configuration of an electric aircraft according to a first embodiment of the present invention.

As shown in FIG. 1, in an electric aircraft 1 according to this embodiment, an electric propulsion system 20 including a propeller 21 for propulsion and an electric motor 22 for driving the propeller 21 is disposed at the leading edge of a wing 10 such that the slipstream generated by the electric propulsion system 20 acts on the wing 10. In the electric aircraft 1, the wing 10 is typically a main wing, but it may be a tail wing or the like. Further, a single electric propulsion system 20 may be provided or two or more electric propulsion systems 20 may be provided. Note that a fuselage and the like are not shown in FIG. 1.

The electric aircraft 1 includes a controller 30 that controls the drive of the electric motor 22. The controller 30 typically controls an inverter 50 interposed between a power supply device 40 and the electric motor 22 to provide power to the electric motor 22 and generate a thrust of the propeller 21, and to extract wind power serving as power through the propeller 21. The electric aircraft 1 has a function to regenerate or a function to reversely rotate the propeller 21 by generating electricity by the electric motor 22. Note that, if the electric aircraft 1 includes two or more electric propulsion systems 20, the controller 30 may be configured to be able to separately control the motor outputs of the electric propulsion systems 20.

Figure 2:
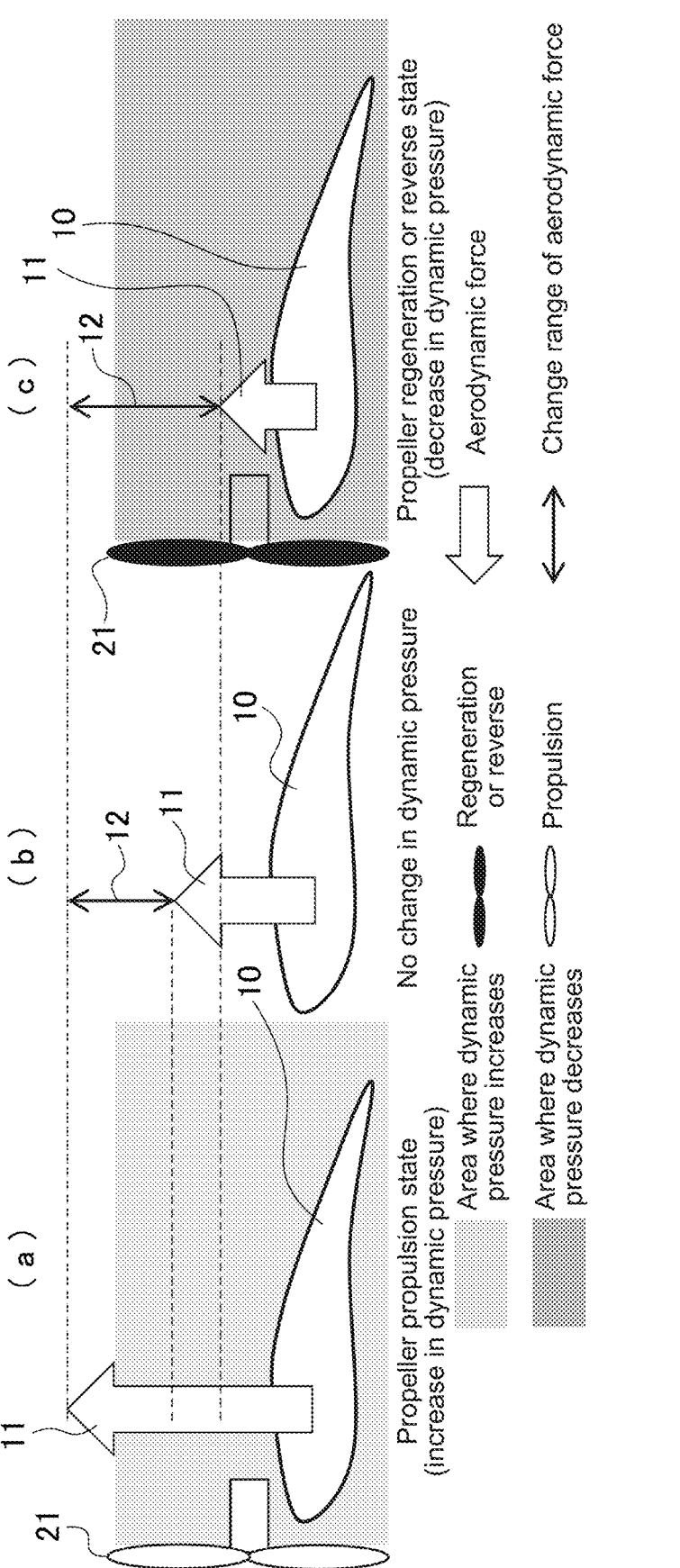
FIG. 2 is an explanatory diagram of the action of the electric aircraft according to the first embodiment of the present invention.

Here, as shown in (a) and (b) of FIG. 2, it is known from Non-Patent Literature 1 that an aerodynamic force 11 of the wing 10 is increased by increasing the above-mentioned thrust of the propeller 21, and Non-Patent Literatures 2 and 3 describe an example in which the increased aerodynamic force 11 is used to control the longitudinal motion of the aircraft. Such control uses, as a control force, a difference between the aerodynamic force 11 necessary for normal flight and the aerodynamic force 11 changed according to an operating state of the electric propulsion system 20, and thus the control force depends on a change range 12 of the aerodynamic force 11. Here, the operating state refers to a propulsion state of the propeller 21 (the state of increase in dynamic pressure, the state in (a) of FIG. 2), a regeneration or reverse state of the propeller 21 (the state of decrease in dynamic pressure, the state in (c) of FIG. 2), or degrees thereof.

Figure 3:
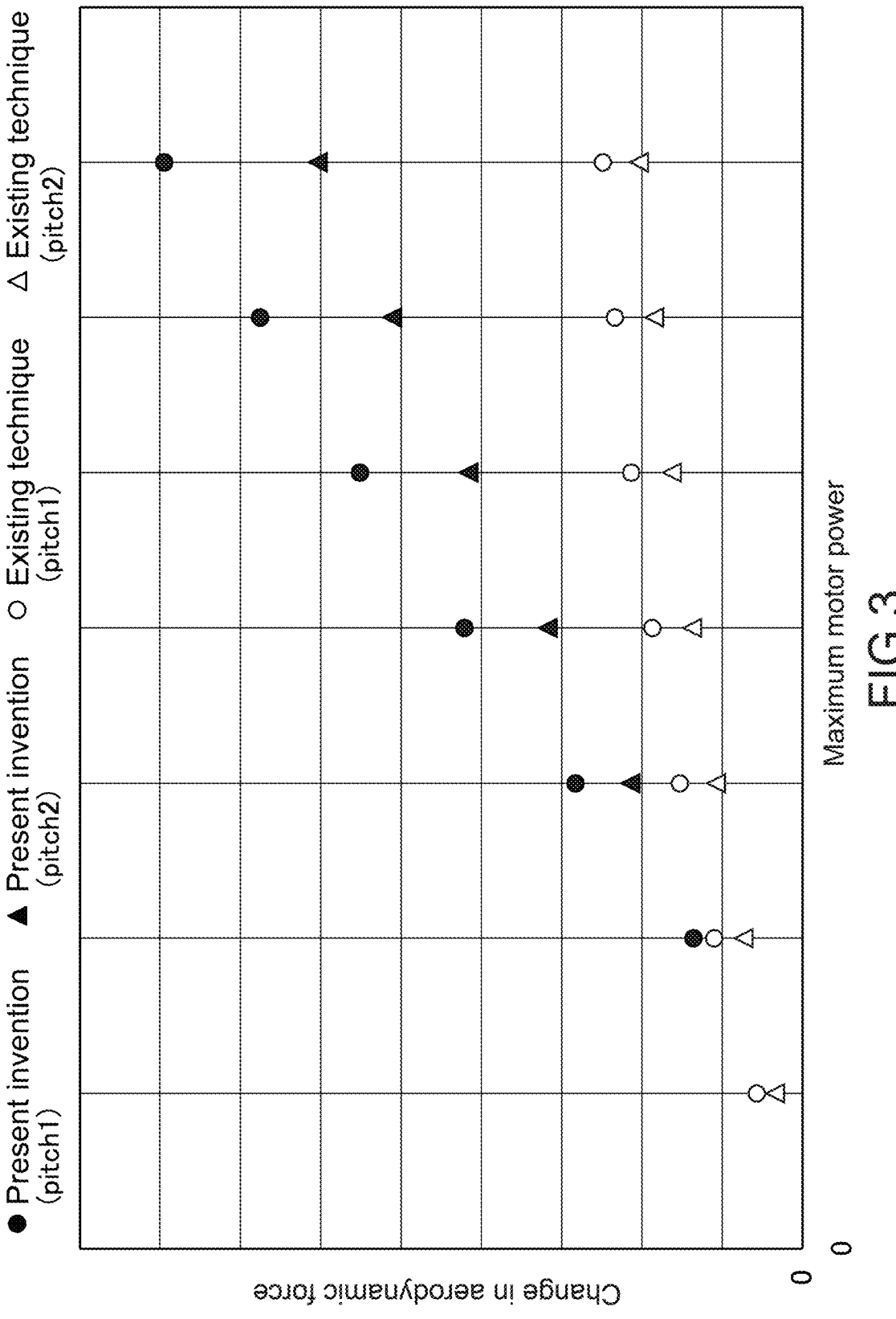
FIG. 3 is a graph showing a relationship between the maximum motor power and a change in aerodynamic force in the electric aircraft according to the first embodiment of the present invention.

Since the change range 12 of the aerodynamic force 11 depends on the driving force of the propeller 21 as shown in FIG. 3, for the control as described above, it has been conventionally necessary for the propulsion system to generate power that is larger than the driving force of the propeller 21 required for normal flight for the purpose of obtaining a large control force, which may cause an increase in weight of the propulsion system.

Figure 20:
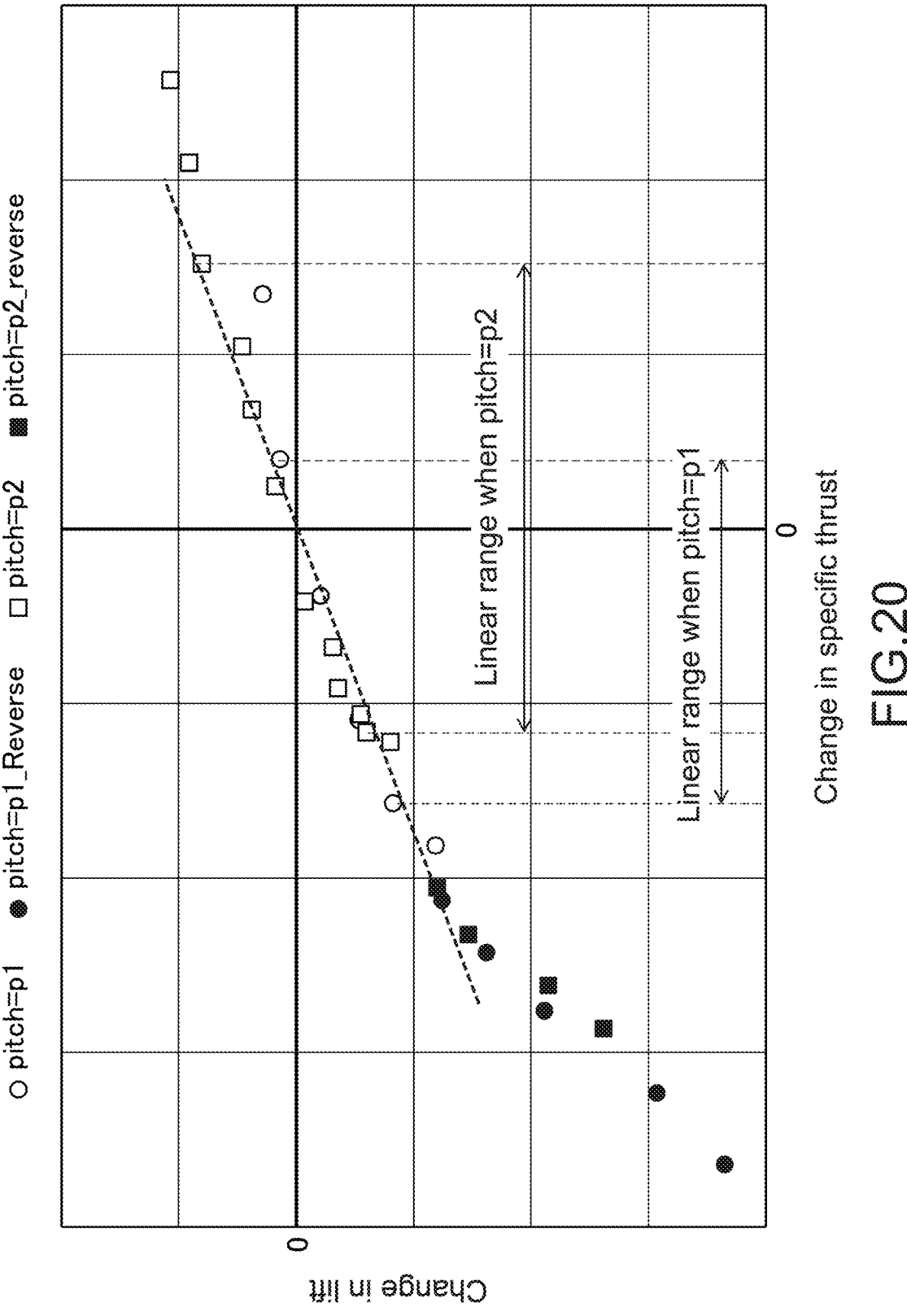
FIG. 20 is a graph showing a relationship between a change in propeller specific thrust and a change in lift according to the fourth embodiment of the present invention.

In contrast, the electric aircraft 1 according to this embodiment is configured not only to increase the driving force, but also to adjust the thrust of the propeller 21 to a negative value, that is, to reduce the slipstream of the propeller 21 by regenerating or reversely rotate the electric propulsion system 20, thus allowing the dynamic pressure acting on the wing 10 to be reduced and allowing the aerodynamic force 11 to be reduced (see (c) of FIG. 2). Here, referring to FIG. 20, the value on the horizontal axis in FIG. 20 is a value that can be output with respect to the thrust during horizontal cruising. If this value is 0, it means that the thrust required for the horizontal cruising is output. Taking the "Pitch1" in FIG. 20 as an example, a positive thrust can be output by approximately 1.3 graduations on the horizontal axis during the cruising, whereas a negative thrust can be output by approximately 3.6 graduations if the reverse rotation is performed, that is, in the range of twice to three times as large as the positive thrust at the maximum, or approximately 2.76 times as large as the positive thrust at the maximum.

Note that, here, the positive thrust is thrust with respect to a flight direction, and the negative thrust is thrust in the direction opposite to the flight direction.

As a result, in the electric aircraft 1 according to this embodiment, the change range 12 of the aerodynamic force 11 can be increased, and a larger control force can be obtained without increasing the power (=weight) of the electric propulsion system 20. In addition, when regeneration is performed using the propeller 21, it is possible to recover part of the energy required for the above-mentioned control, and it is also possible to improve fuel consumption performance.

The electric aircraft 1 according to this embodiment may also be configured to use a variable pitch propeller as the propeller 21 to change the pitch during reverse or regeneration. With this configuration, for example, a lower pitch angle is set when regeneration is performed, so that a synergistic effect is obtained in terms of increasing the amount of regenerative energy and also increasing the change range 12 of the aerodynamic force 11.

Figure 4:
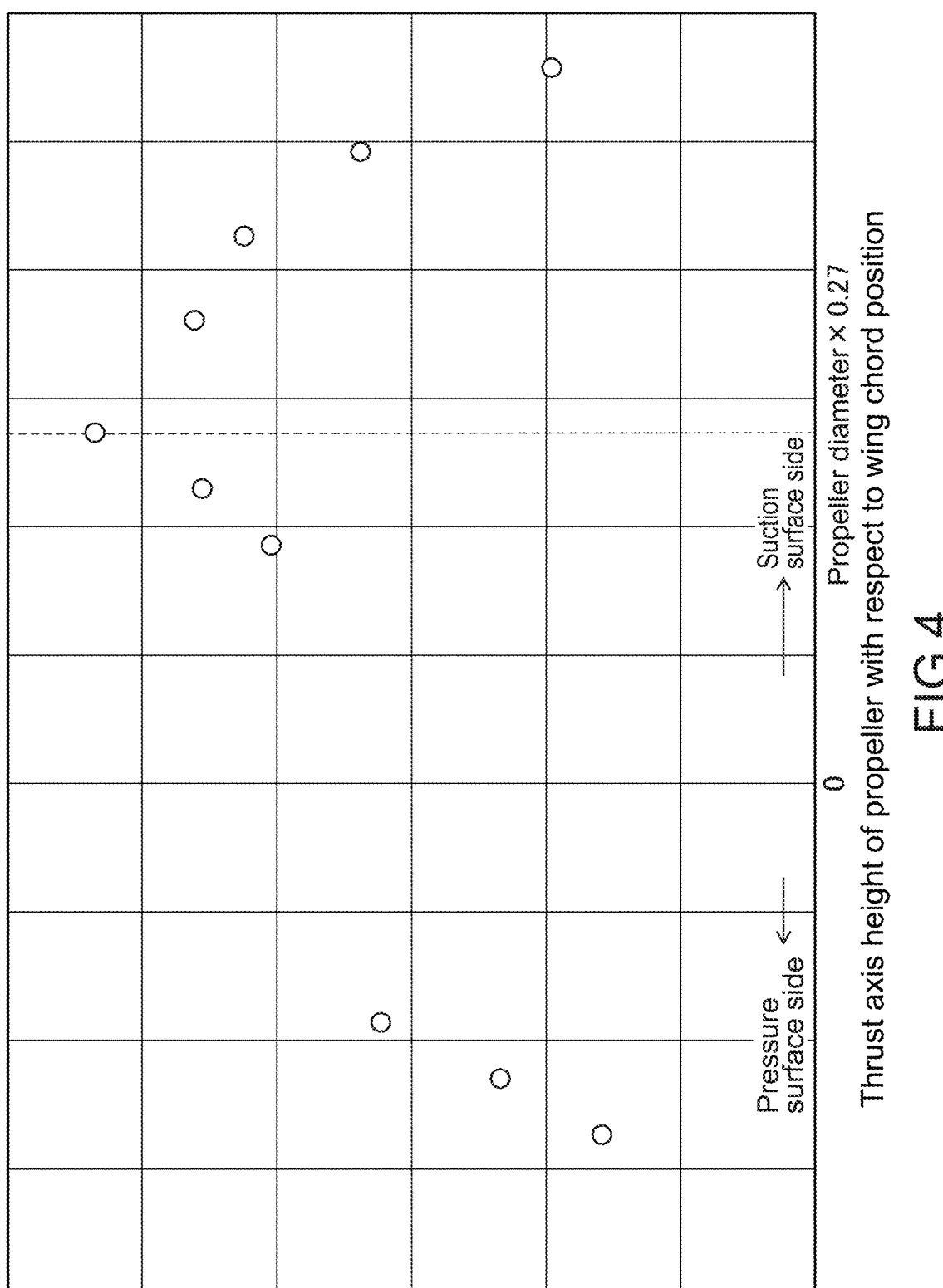
FIG. 4 is a graph showing a relationship between the thrust axis height of a propeller and a change in aerodynamic force with respect to a wing chord position in the electric aircraft according to the first embodiment of the present invention.

In the electric aircraft 1 according to this embodiment, it is favorable that the thrust axis of the propeller 21 is located on the suction surface side of the main wing (for example, on the upper side of the wing 10 in FIG. 1). In this case, as shown in FIG. 4, the following special effects can be obtained: a change in dynamic pressure generated in the slipstream of the propeller 21, including a regeneration operating state, can be more effectively caused to act on the main wing; and the change range 12 of the aerodynamic force 11 can be further increased. As can be seen from FIG. 4, if the thrust axis of the propeller 21 is located on the suction surface side of the main wing and located at a height of (propeller diameter×0.27) with respect to a wing chord position, the change in aerodynamic force is the largest.

Note that the electric aircraft 1 typically includes a storage device (not shown) including a data group relating to the rotation speed of the propeller 21 or the specific thrust to be described later and the lift of the wing 10, the controller 30 reads the data from the storage device, and a torque or a rotation-speed command value is output from the controller 30 to the inverter 50 on the basis of the data. However, using the controller 30 that performs learning by a neural network regarding a relationship between the rotation speed of the propeller 21 during flight or in a ground test or the specific thrust to be described later and the lift of the wing 10, it is possible to perform appropriate control even when the relationship between the rotation speed or the specific thrust and the lift is changed due to the change of the properties of the propeller 21 and the wing 10 (adhesion of insects and dirt to the surface) without the need to provide the data group in advance in the storage device.

Second Embodiment

Figure 5:
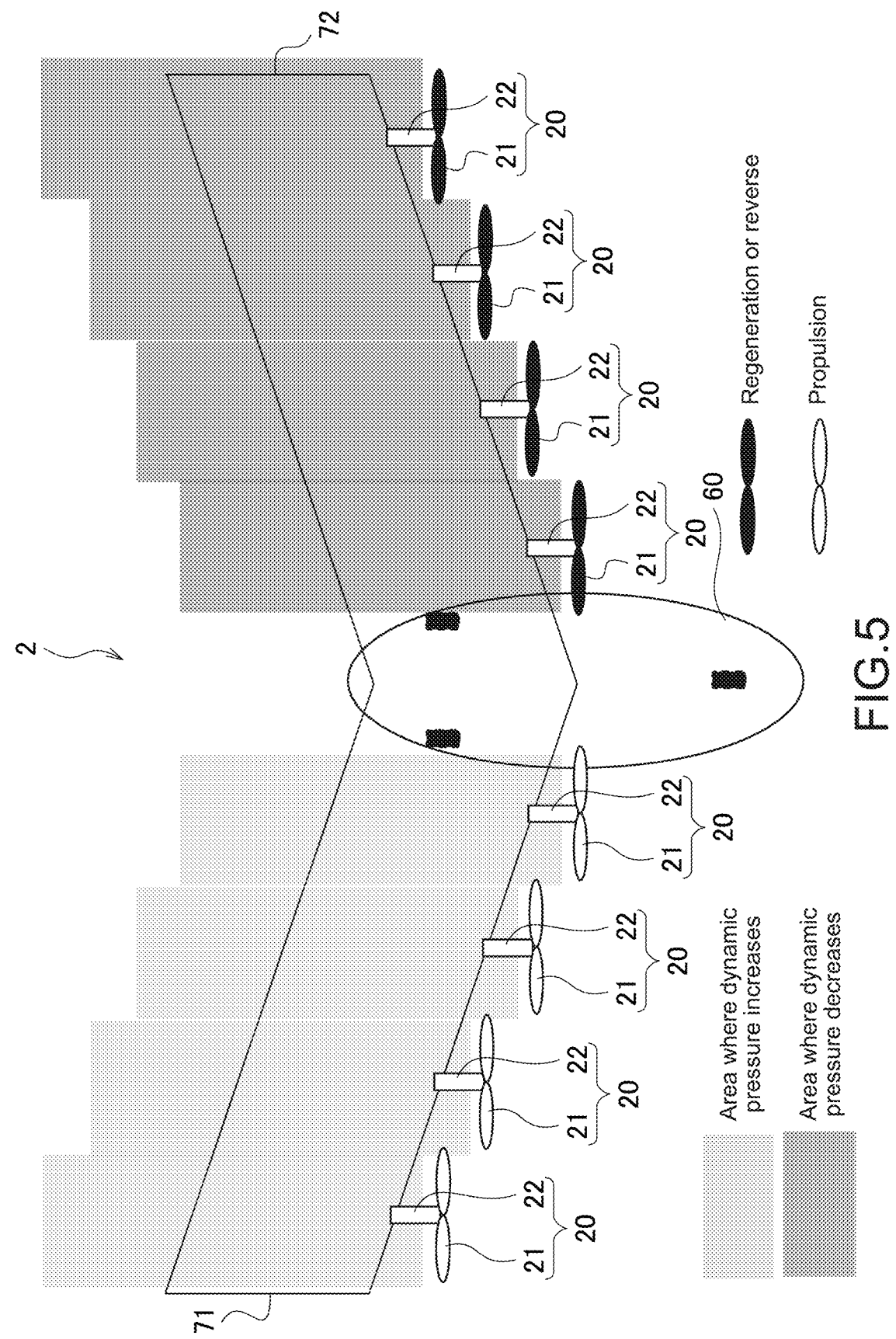
FIG. 5 is a plan view showing a configuration of an electric aircraft according to a second embodiment of the present invention.
Figure 6:
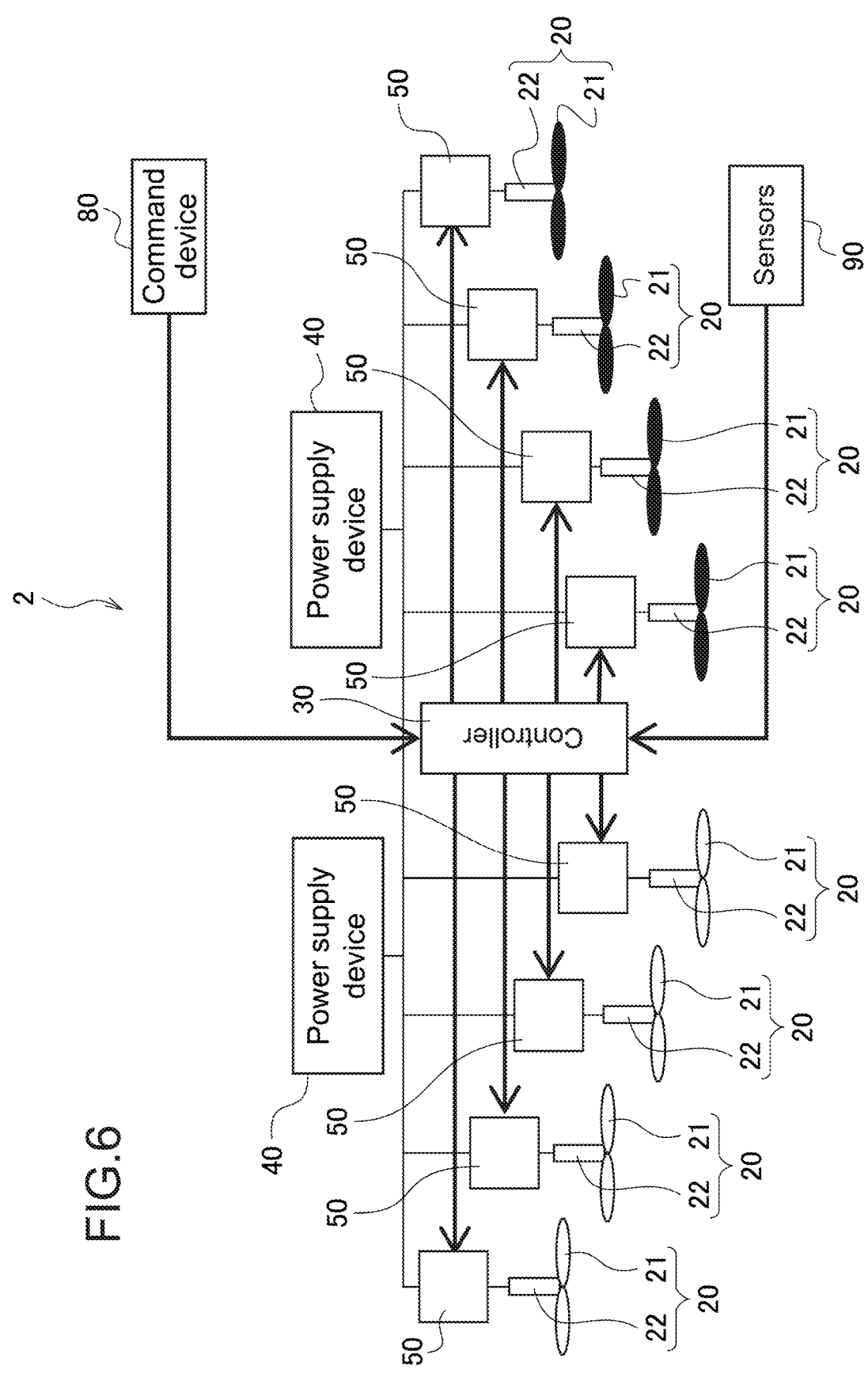
FIG. 6 is a block diagram showing the configuration of the electric aircraft according to the second embodiment of the present invention.

FIG. 5 is a plan view of an electric aircraft according to a second embodiment of the present invention, and FIG. 6 is a block diagram of the configuration of the electric aircraft.

As shown in FIGS. 5 and 6, an electric aircraft 2 according to this embodiment includes a plurality of, in this case, four electric propulsion systems 20, each of which includes a propeller 21, at each leading edge of a left main wing 71 and a right main wing 72 of a fuselage 60 such that the slipstream of the electric propulsion systems 20 acts on the main wings 71 and 72. Each electric propulsion system 20 includes the propeller 21 and an electric motor 22.

The electric aircraft 2 includes a controller 30 that controls the drive of each electric motor 22. The controller 30 performs control according to a command of a command device 80 such as a throttle, a joystick, a rudder pedal, or a wireless operation device. Further, the controller 30 inputs data from sensors 90 such as a gyroscope, an accelerometer, a GPS, and a Pitot tube.

The controller 30 controls each inverter 50 interposed between the right or left power supply device 40 and each electric motor 22 to supply power to each electric motor 22 and generate a thrust of the propeller 21 and also to extract wind power serving as power through the propeller 21. The electric aircraft 2 has a function to regenerate or a function to reversely rotate the propellers 21 by generating electricity by the electric motors 22.

Here, when a difference is generated in the lift generated in the right and left main wings in order to obtain a rolling moment for changing the attitude of the aircraft on the roll axis at the time of turning, it is considered that the thrust of the propulsion system of the one-side main wing is increased to increase the speed of the slipstream of the propulsion system and increase the lift, as described in Non-Patent Literature 1. In this case, the thrust of the entire aircraft also needs to be increased to a desired level required for the flight at the same time as the lift is increased. Further, in the turning using a conventional aileron, a yawing moment generated by the operation is generated in the direction opposite to the turning direction, and thus it is generally necessary to provide a rudder or the like to correct the yaw moment.

In contrast, the electric aircraft 2 according to this embodiment is configured to increase the propeller thrust of the one-side main wing and to decrease the propeller thrust of the opposite-side main wing to a negative value by regeneration or reverse. For example, as shown in FIG. 5, the electric aircraft 2 according to this embodiment increases the thrust generated by the propellers 21 of the left main wing 71 and decreases the thrust generated by the propellers 21 of the right main wing 72 to a negative value by regeneration or reverse.

Thus, the electric aircraft 2 according to this embodiment is capable of turning while keeping the lift of the entire aircraft at a desired level required for the flight. In addition, since the yawing moment generated by increasing the propeller thrust of the one-side main wing and decreasing the propeller thrust of the other-side main wing to a negative value works in the same direction as the turning direction and can be adjusted by the distribution of each propeller thrust, if the yaw moment is adjusted to a value at which the turning movement is promoted, the existing control surface such as the aileron or the rudder can be replaced or omitted.

Figure 7:
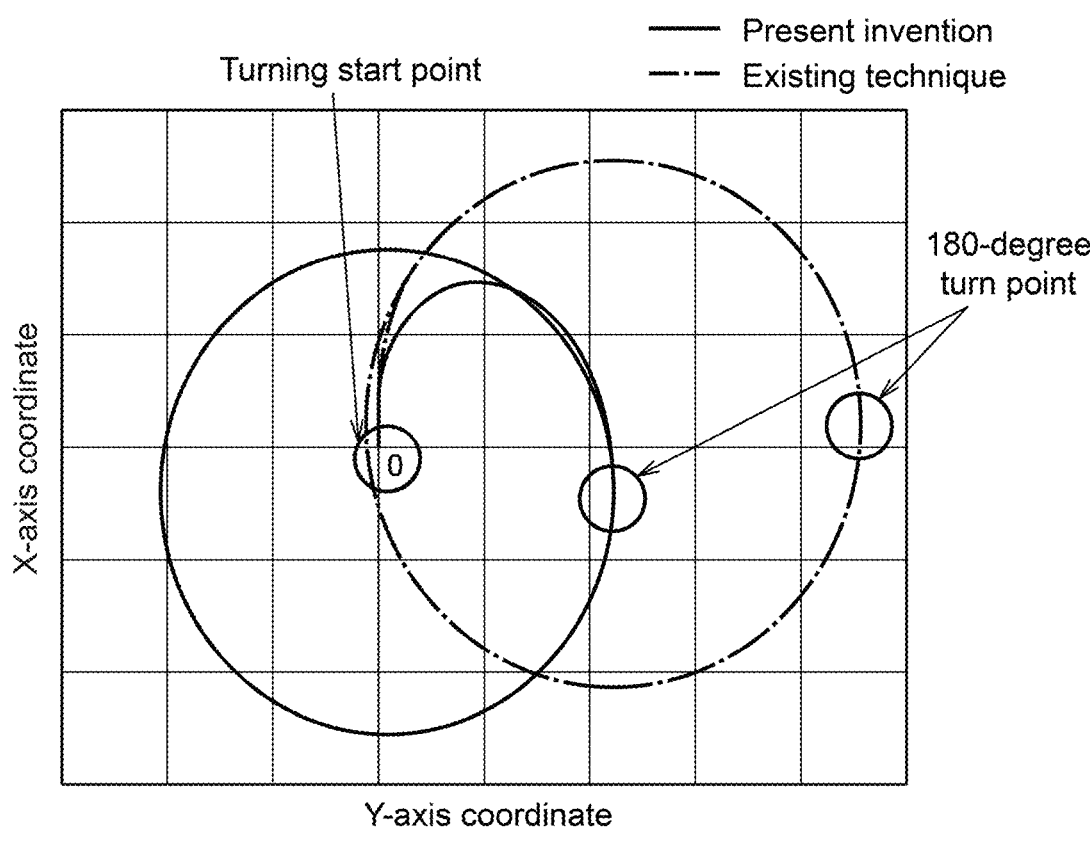
FIG. 7 is a diagram showing a trajectory viewed from the plane at the time of turning of the electric aircraft according to the second embodiment of the present invention as compared with a conventional example.
Figure 8:
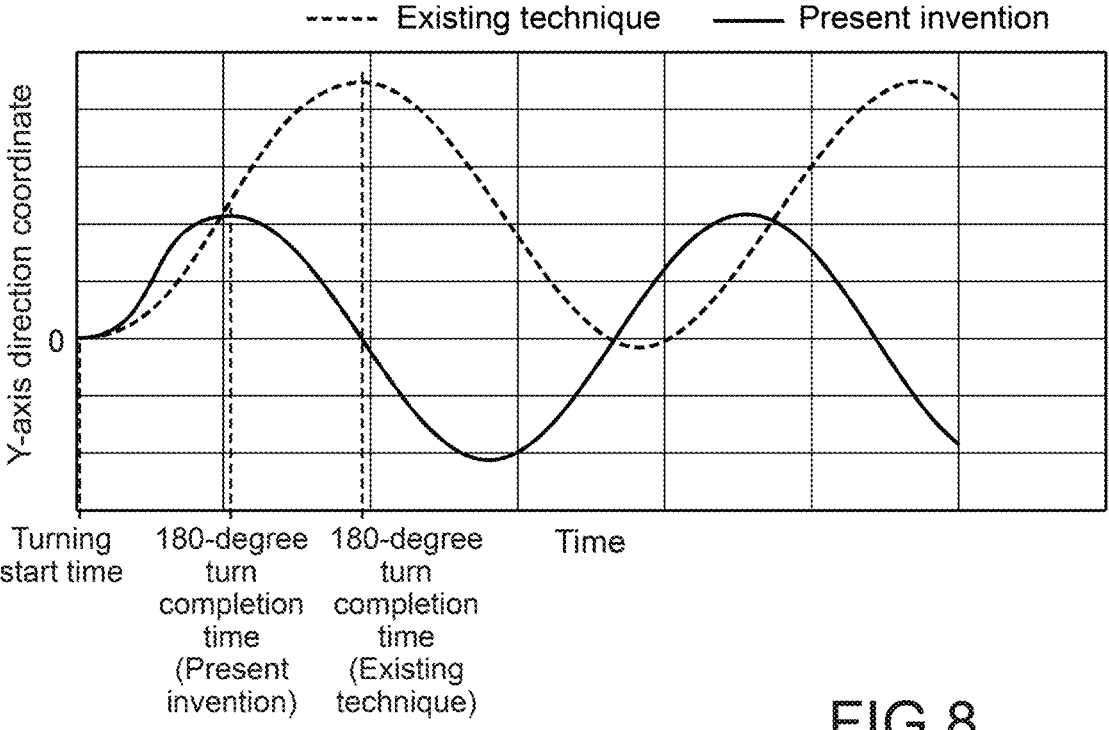
FIG. 8 is a graph showing the position (Y-axis direction coordinate) on the time-axis of the trajectory at the time of turning of the electric aircraft according to the second embodiment of the present invention as compared with a conventional example.
Figure 9:
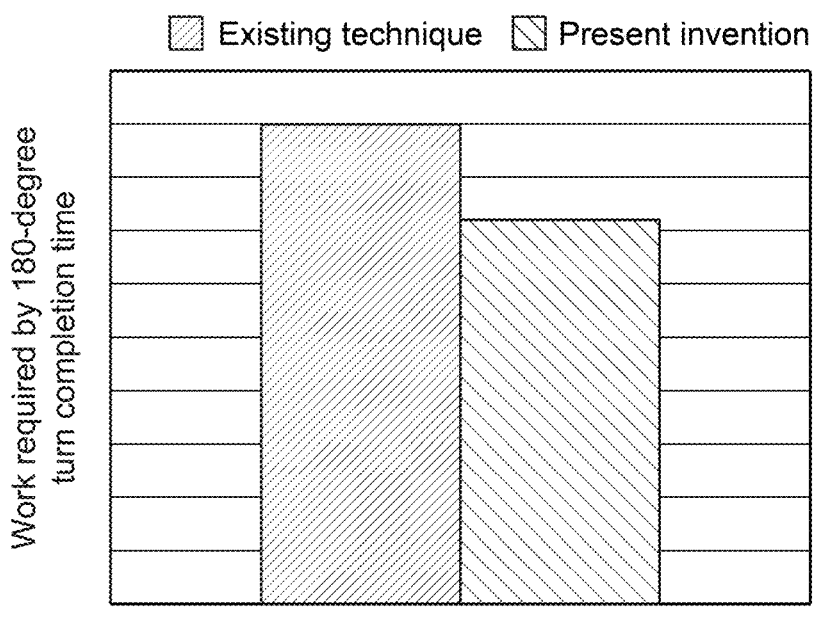
FIG. 9 is a graph showing the amount of work at the time of turning of the electric aircraft according to the second embodiment of the present invention as compared with a conventional example.

In addition, the turning by the electric aircraft 2 according to this embodiment provides the following special effects: the distance in the Y-axis direction from a turning start point to a 180-degree turn point can be reduced as compared with the case where the turning is performed using the existing control surface as shown in FIG. 7; the time required to complete the 180-degree turn can be shortened as shown in FIG. 8; and the work required to complete the 180-degree turn can also be reduced as compared with the case of using the existing control surface as shown in FIG. 9.

Further, in the electric aircraft 2 according to this embodiment, even when an electric propulsion system 20 is defective and one or a plurality of electric propulsion systems 20 fail to generate a positive thrust, it is possible to perform attitude control by utilizing the power generated by the electric propulsion system 20 that has generated a negative thrust and regenerated and by causing a normal electric propulsion system 20 to generate a positive thrust. Meanwhile, all the electric propulsion systems 20 installed in the main wings 71 and 72 are caused to generate a negative thrust, and for example, the electric propulsion systems 20 closer to the right wing tip (wing tip of the main wing 72) are caused to generate a larger negative thrust by regeneration, so that the aircraft can be safely operated even when all the power sources in the aircraft are unavailable, such as a case where right turning is performed while the power obtained by regeneration is used for operating the avionics and actuators.

Figure 10:
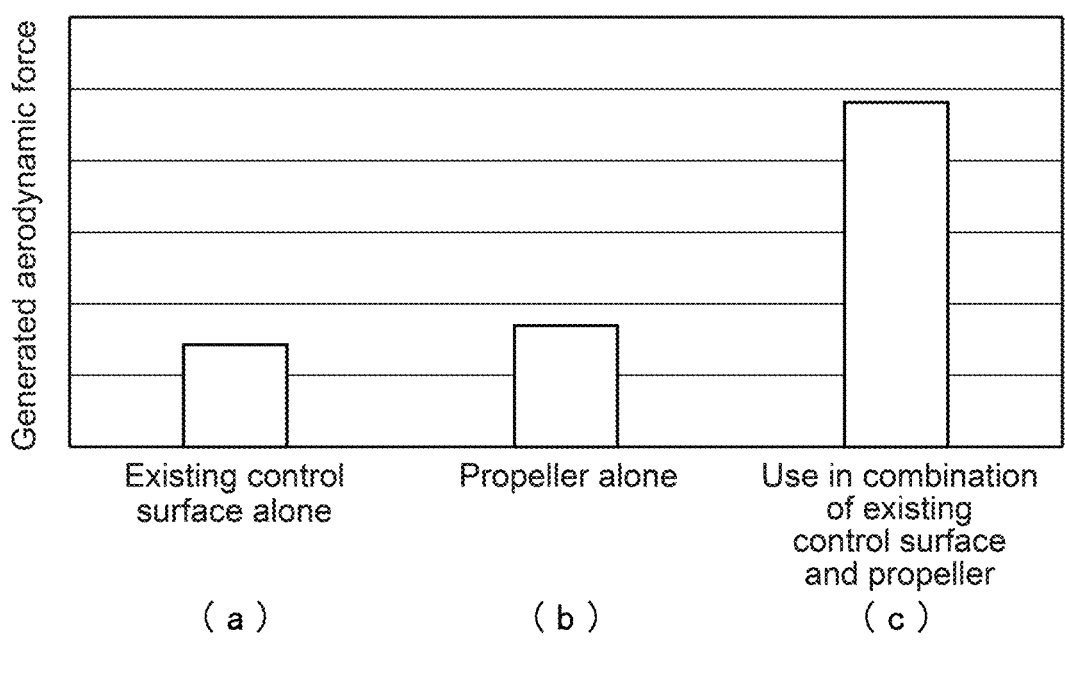
FIG. 10 is a graph in which the air volumes generated in the electric aircraft according to the second embodiment of the present invention are compared in respective forms, in which (a) shows a case of an existing control surface alone, (b) shows a case of a propeller alone, and (c) shows a case of using the existing control surface and the propeller in combination.

Furthermore, when the electric aircraft 2 (the configuration shown in FIGS. 5 and 6) according to this embodiment is applied to the aircraft equipped with an existing control surface such as aileron, the propellers 21 are disposed such that the existing control surface is located at a position where the slipstream accelerated or decelerated by them acts on the existing control surface, and the existing control surface is thus intentionally affected by the slipstream of the propellers 21. Thus, it is possible to generate a roll moment larger than the roll moment generated only by the existing control surface without using the existing control surface and the propellers 21 in combination. What is more, as shown in FIG. 10, in the case where both of them are used in combination ((c) of FIG. 10), it is possible to generate a roll moment larger than a roll moment obtained by adding together a roll moment generated when the existing control surface is operated ((a) of FIG. 10) and a roll moment generated when the propeller 21 (the configuration shown in FIGS. 5 and 6) is applied alone ((b) of FIG. 10). The synergistic effect by the propeller 21 alone (the configuration shown in FIGS. 5 and 6) and the existing control surface can provide a large roll moment.

Third Embodiment

Figure 11:
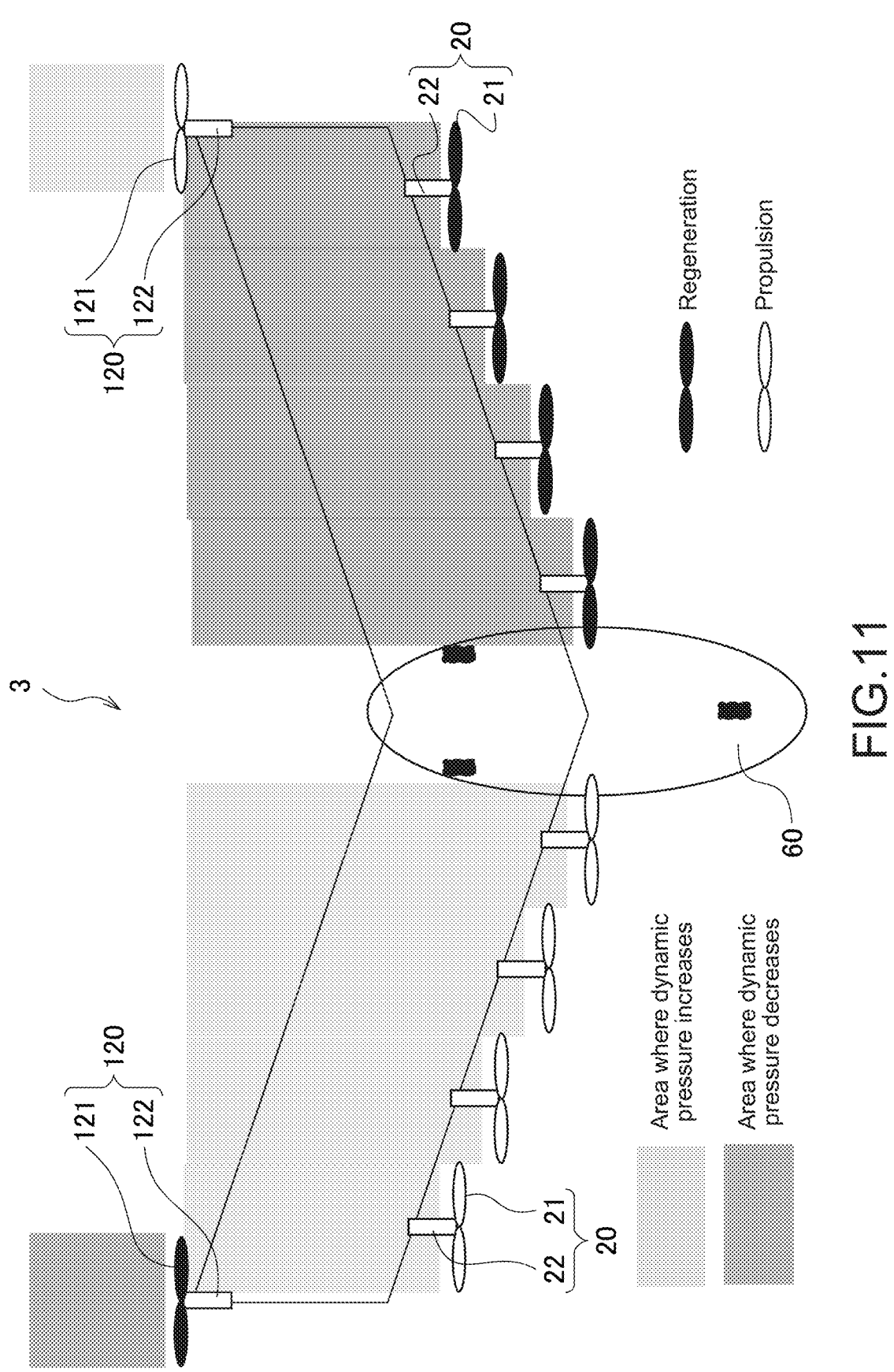
FIG. 11 is a plan view showing a configuration of an electric aircraft according to a third embodiment of the present invention.
Figure 12:
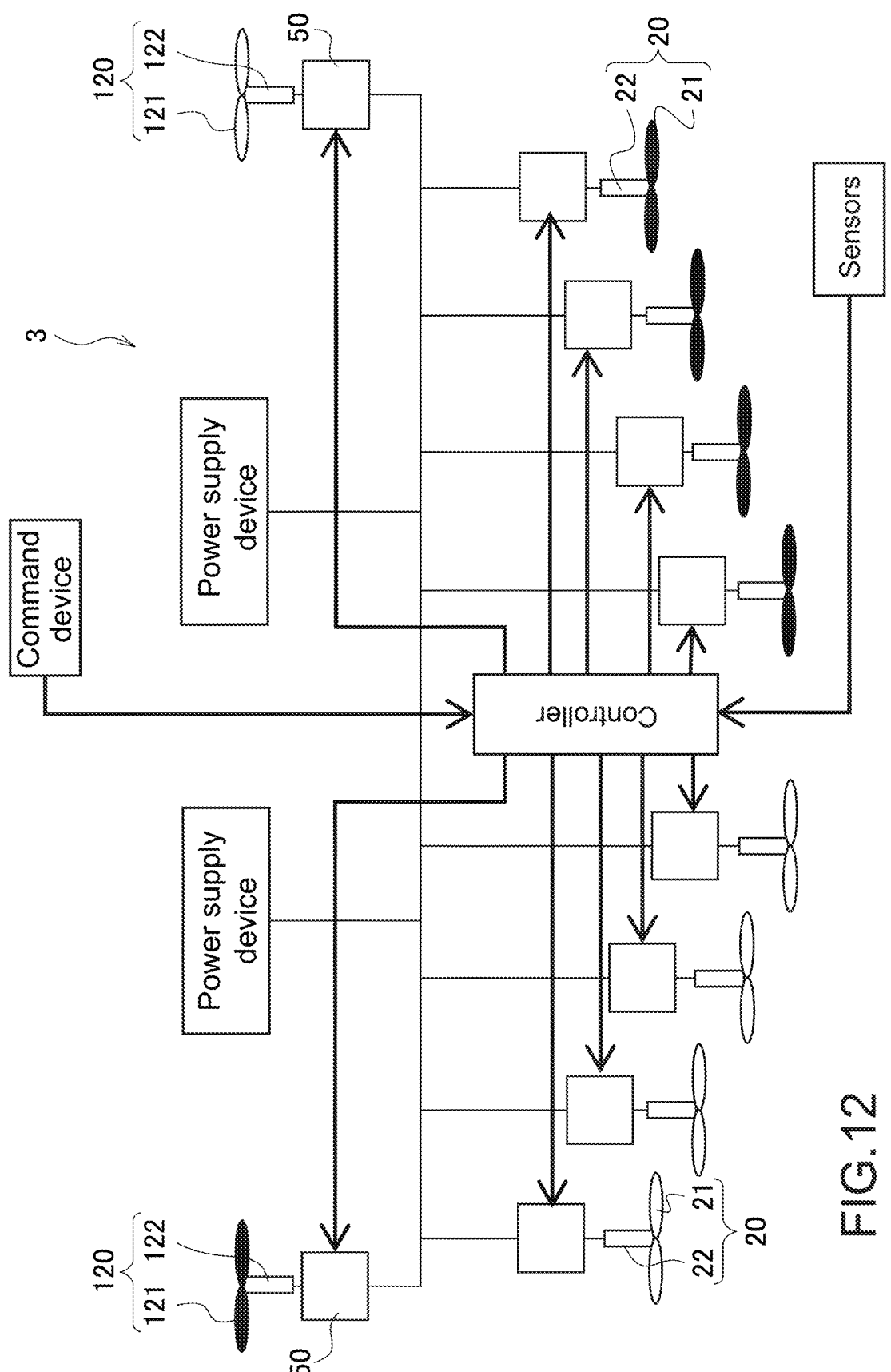
FIG. 12 is a block diagram showing the configuration of the electric aircraft according to the third embodiment of the present invention.
Figure 13:
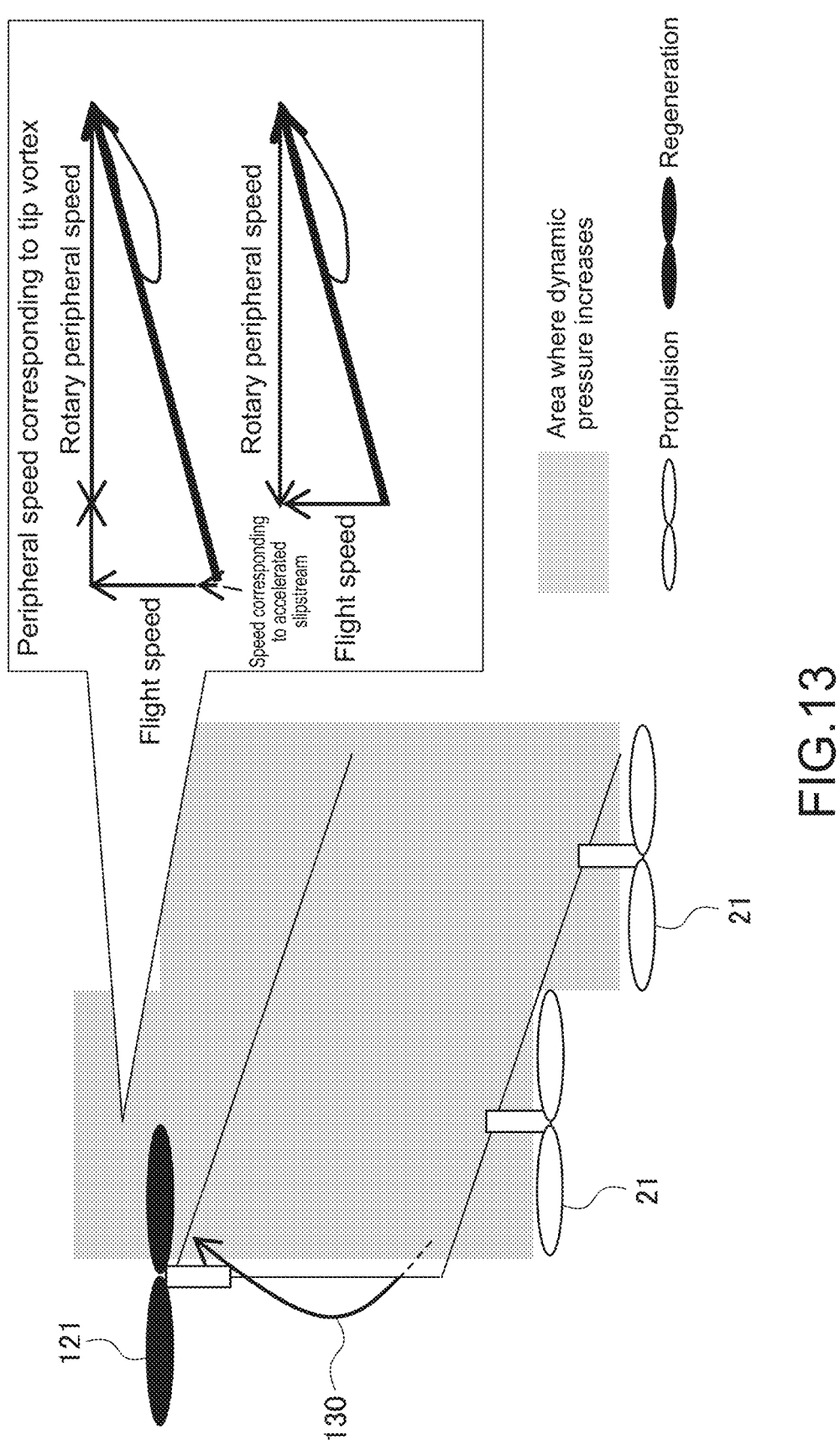
FIG. 13 is an explanatory diagram showing the vicinity of the main wing tip portion of FIG. 11 in an enlarged manner.

FIG. 11 is a plan view of an electric aircraft according to a third embodiment of the present invention, and FIG. 12 is a block diagram of the configuration of the electric aircraft. FIG. 13 is an explanatory diagram of an enlarged portion of FIG. 11. Note that the same elements as those shown in the above embodiments are denoted by the same reference numerals in FIGS. 11 and 12.

As shown in FIGS. 11 and 12, similarly to the electric aircraft 2 according to the second embodiment, an electric aircraft 3 according to this embodiment includes a plurality of, in this case, four electric propulsion systems 20, each of which includes a propeller 21, at each leading edge of a left main wing 71 and a right main wing 72 of a fuselage 60 such that the slipstream of the electric propulsion systems 20 acts on the main wings 71 and 72. Each electric propulsion system 20 includes the propeller 21 and an electric motor 22. In addition to those configurations, the electric aircraft 3 includes similar electric propulsion systems 120 disposed behind the wing tips of the main wings 71 and 72. Each electric propulsion system 120 includes a propeller 121 and an electric motor 122.

The electric aircraft 3 includes a controller 30 that controls the drive of each of the electric motors 22 and 122. The controller 30 performs control according to a command of a command device 80 such as a throttle, a joystick, a rudder belt, or a wireless operation device. Further, the controller 30 inputs data from sensors 90 such as a gyroscope, an accelerometer, a GPS, and a Pitot tube.

The controller 30 controls each inverter 50 interposed between the right or left power supply device 40 and each of the electric motors 22 and 122 to supply power to each of the electric motors 22 and 122 and to generate a thrust of the propellers 21 and 121 and also to extract wind power serving as power through the propellers 21 and 121. The electric aircraft 3 has a function to regenerate or a function to reversely rotate the propellers 21 and 121 by generating electricity by the electric motors 22 and 122.

Here, in order to obtain the roll moment for changing the attitude of the aircraft on the roll axis, if the thrust is increased in the main wing (assumed as the main wing 71 in FIG. 11) on the side where the lift is to be increased, and the regeneration or reverse operation is performed by the propulsion system to generate the drag in the other-side main wing (assumed as the main wing 72 in FIG. 11), a yaw moment resulting from a thrust difference in the main wings 71 and 72 is generated. If this moment is excessive, the main wing 72 may fall into stall.

In contrast, the electric aircraft 3 according to this embodiment is configured to be capable of being operated such that the electric propulsion systems 120 installed at the trailing edges close to the wing tips of the respective main wings 71 and 72 and the electric propulsion systems 20 installed other than those above have the change in thrust with opposite signs, in a manner that the electric propulsion system 120 on the main wing 71 side is regenerated, and the electric propulsion system 120 on the main wing 72 side is increased in thrust in the electric propulsion systems 120 installed at the trailing edges closest to the wing tips of the main wings 71 and 72.

Figure 14:
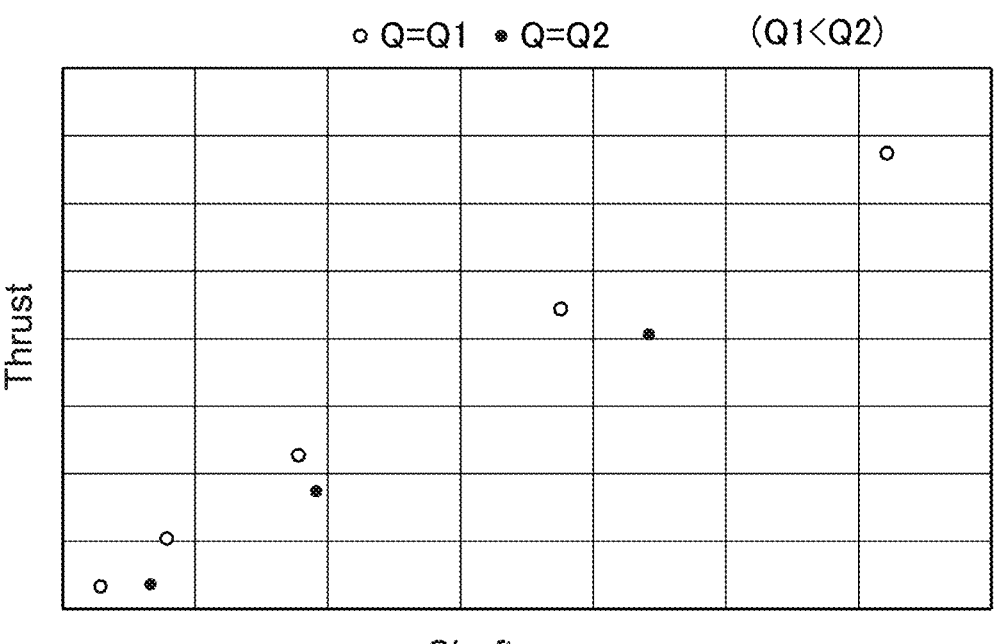
FIG. 14 is a graph showing a relationship between shaft power and thrust according to the third embodiment of the present invention.
Figure 15:
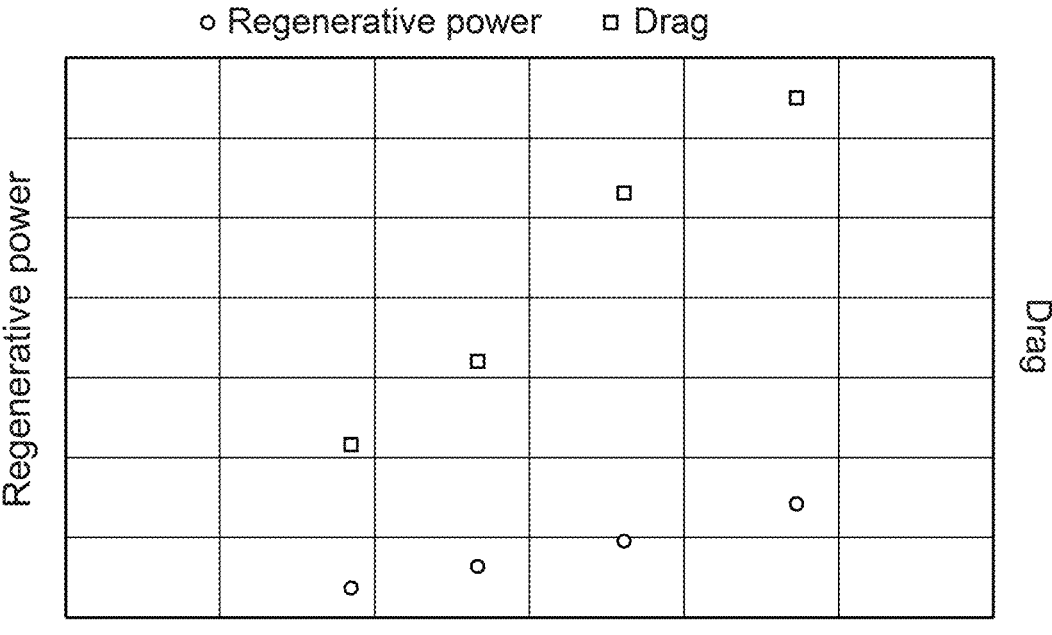
FIG. 15 is a graph showing a relationship between a dynamic pressure and regenerative power according to the third embodiment of the present invention.

Thus, the flow entering the propellers 121 at the trailing edges close to the wing tips of the main wings 71 and 72 is affected by the slipstream of the propellers 21 installed at the leading edges. If the propeller 121 of the wing tip increases the thrust, an inflow dynamic pressure is lowered, and a desired thrust (yaw moment) can be generated with less propeller power as shown in FIG. 14. In FIG. 14, Q1 represents the dynamic pressure (according to the configuration of this embodiment) flowing into the propeller 121 in a lowered state by being affected by the propeller 21, and Q2 represents the dynamic pressure (according to a conventional configuration) flowing in without being affected by the propeller 21. Conversely, if the propeller 121 of the wing tip performs a regenerative behavior, the inflow dynamic pressure is increased to not only generate a yaw moment but also to regenerate a larger amount of energy as shown in FIG. 15.

Figure 16:
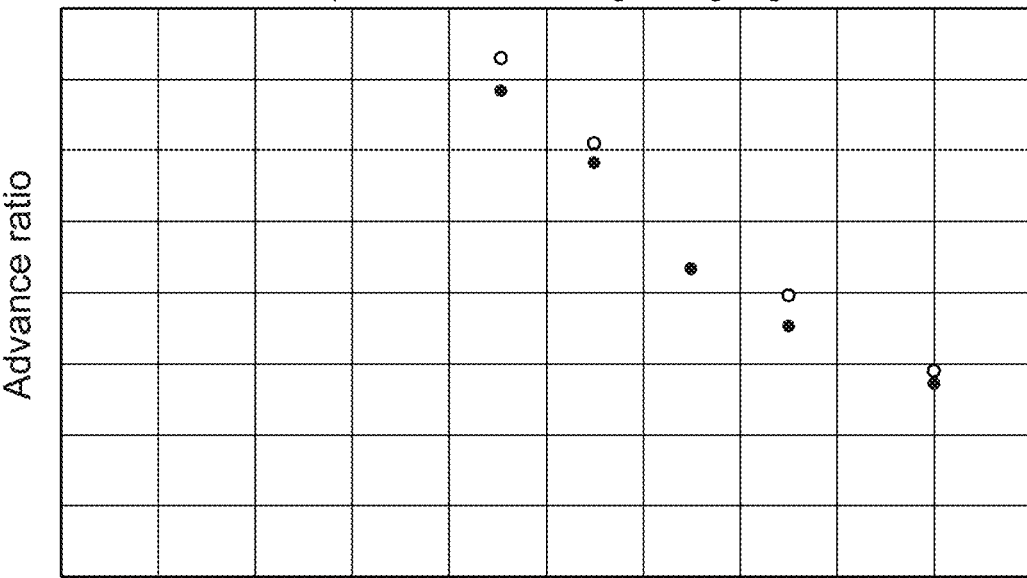
FIG. 16 is a graph showing a relationship between a motor output command and an advance ratio according to the third embodiment of the present invention.

In addition, in the electric aircraft 3 according to this embodiment, the propellers 121 installed behind the wing tips of the main wings 71 and 72 are operated in the rotation direction (Inboard Up) in which the inboard side of the main wings 71 and 72 is raised upward (reference numeral 130 in FIG. 13). At that time, as a result of the increase or decrease in the lift of the main wings 71 and 72 by the propellers 21 at the leading edges, the intensity of a tip vortex changes, and the advance ratio operating in the propellers 121 at the wing tips effectively changes as shown in FIG. 16, unlike the propellers 21 located at a place other than the wing tips. At that time, the operating state (rotation speed) of the propellers 121 at the wing tips is changed in the inboard-up direction while monitoring the operating state of the propellers 21 at the leading edges, and thus it is possible to perform operation while decreasing the change in the advance ratio that changes simultaneously with the change of the inflow speed to the propellers 121 at the wing tips, and it is possible to maintain a highly efficient advance ratio in either of the operating states of thrust generation and regeneration, thus allowing a more efficient operation.

Fourth Embodiment

Figure 17:
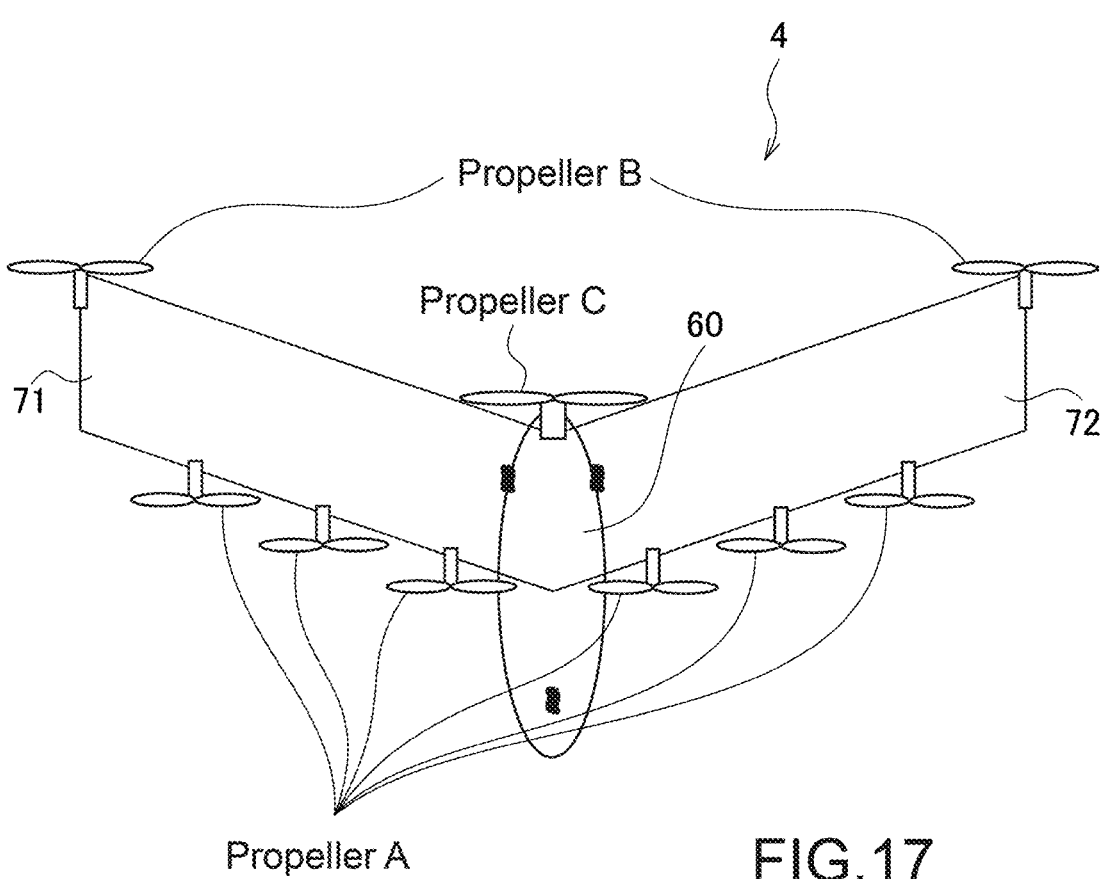
FIG. 17 is a plan view showing a configuration of an electric aircraft according to a fourth embodiment of the present invention.

FIG. 17 is a plan view of an electric aircraft according to a fourth embodiment. Table 1 of FIG. 18 and Table 2 of FIG. 19 show the degree of influence of the operating state of each propulsion system on each axial motion.

As shown in FIG. 17, an electric aircraft 4 according to the fourth embodiment further includes an on-axis propeller C mounted on the axis of the aircraft in a planar arrangement of the electric aircraft 3 shown in FIGS. 11 and 12. In this embodiment, the propellers 21 at the leading edges of the main wings 71 and 72 of the electric aircraft 3 are each assumed as a main wing propeller A, and the propellers 121 at the wing tips of the main wings 71 and 72 of the electric aircraft 3 are each assumed as a wing tip propeller B. Like the main wing propellers A and the wing tip propellers B, the on-axis propeller C is also driven by an electric motor (not shown). Power is supplied from a power supply device (not shown) to the electric motor via an inverter (not shown). The inverter of the on-axis propeller C is controlled by a controller (not shown) that is common to the main wing propellers A and the wing tip propellers B.

Here, when the operating states of the main wing propellers A and the wing tip propellers B are changed in the motion on the roll axis, not only the lateral movement on the yaw axis or the like but also the longitudinal movement in the lift direction or the like are affected, and thus it is necessary to construct a complicated six-degrees-of-freedom control model including the interfering effect of each axis in the movement control law, which increases the costs of the control system.

In contrast, in the electric aircraft 4 according to this embodiment, in order to use a simple control model separated into three degrees of freedom in the vertical and horizontal directions, which is generally used in a fixed-wing aircraft, the propellers are divided into the main wing propellers A, the wing tip propellers B, and the on-axis propeller C. The thrusts of the main wing propellers A, the wing tip propellers B, and the on-axis propeller C (hereinafter, collectively referred to as "propellers A, B, and C") are represented as T_A, T_B, and T_C, respectively, and the control is performed as follows.

As shown in Table 1 of FIG. 18, since T_A and T_B affect the motion on five axes other than a lateral force axis among the six axes, if these are simply used as control variables, it is difficult to construct a control model separated into the vertical and horizontal directions.

So, first, the thrust is made dimensionless and set as a specific thrust of $Tc = T/(0.5\ \rho U^2 Dp^2)$ ($\rho$: air density, U: airspeed, Dp: propeller diameter). Furthermore, for Tc_A and Tc_B, the sum of the right and left thrusts with respect to the axis of the aircraft is set as $\Sigma Tc\_A$ and $\Sigma Tc\_B$, respectively, and the difference is set as $\Delta Tc\_A$ and $\Delta Tc\_B$, respectively. Those are set as control variables.

Since the relationship between the change in specific thrust and the change in lift occurring in the corresponding wing is as shown in FIG. 20, when the propellers A, B, and C are operated in the "linear ranges" thereof, the sum of the change in lift occurring in the left and right main wings 71 and 72 affects $\Sigma Tc\_A$ and $\Sigma Tc\_B$, and the difference affects only $\Delta Tc\_A$ and $\Delta Tc\_B$. Therefore, the sum of the change in lift (the change in lift of the entire aircraft) and the difference (the change in roll moment of the entire aircraft) can be separated and specified by $\Sigma Tc\_A$, $\Sigma Tc\_B$, $\Delta Tc\_A$, and $\Delta Tc\_B$. Note that, in FIG. 20, p1 and p2 of the pitch indicate the case where propellers A, B, and C have different pitch angles, and _Reverse indicates the case where the propellers A, B, and C are reversed.

In the electric aircraft 4 according to this embodiment, the controller adjusts the pitch angles or rotation directions of the respective propellers A, B, and C, that is, the electric propulsion systems, such that a variable relating to the operating state (in this case, the specific thrust) and a desired aerodynamic force (lift) become linear. Thus, as shown in Table 2 of FIG. 19, the influence of the linearly connected value of each specific thrust can be limited to either of the three degrees of freedom in the vertical and horizontal directions, and a control model separated into the vertical and horizontal directions can be constructed as shown in Equation (1) below.

$$\text{Equation (1)}$$

$$\Delta X =$$

$$\frac{\partial X}{\partial u}u + \frac{\partial X}{\partial w}w + \frac{\partial X}{\partial \Sigma T_{c\_A}}\Sigma T_{c\_A} + \frac{\partial X}{\partial \Sigma T_{c\_B}}\Sigma T_{c\_B} + \frac{\partial X}{\partial T_{c\_C}}T_{c\_C}$$

$$\Delta Y = \frac{\partial Y}{\partial v} + \frac{\partial Y}{\partial p}p + \frac{\partial Y}{\partial r}r$$

$$\Delta Z = \frac{\partial Z}{\partial u}u + \frac{\partial Z}{\partial w}w + \frac{\partial Z}{\partial q}q + \frac{\partial Z}{\partial \Sigma T_{c\_A}}\Sigma T_{c\_A} + \frac{\partial Z}{\partial \Sigma T_{c\_B}}\Sigma T_{c\_B} + \frac{\partial Z}{\partial T_{c\_C}}T_{c\_C}$$

$$\Delta L = \frac{\partial L}{\partial v}v + \frac{\partial L}{\partial p}p + \frac{\partial L}{\partial r}r + \frac{\partial L}{\partial \Delta T_{c\_A}}\Delta T_{c\_A} + \frac{\partial L}{\partial \Delta T_{c\_B}}\Delta T_{c\_B}$$

-continued $$\Delta M = \frac{\partial M}{\partial u}u + \frac{\partial M}{\partial w}w + \frac{\partial M}{\partial w'}w' +$$

$$\frac{\partial M}{\partial q}q + \frac{\partial M}{\partial \Sigma T_{c\_A}} + \Sigma T_{c\_A} + \frac{\partial M}{\partial \Sigma T_{c\_B}}\Sigma T_{c\_B} + \frac{\partial M}{\partial T_{c\_C}}T_{c\_C}$$

$$\Delta N = \frac{\partial N}{\partial v}v + \frac{\partial N}{\partial p}p + \frac{\partial N}{\partial r}r + \frac{\partial N}{\partial \Delta T_{c\_A}}\Delta T_{c\_A} + \frac{\partial N}{\partial \Delta T_{c\_B}}\Delta T_{c\_B}$$

Note that the specific thrust is used as a variable relating to the operating state in this embodiment, but the ratio of the thrust and the dynamic pressure may be used as a variable relating to the operating state, for example.

Fifth Embodiment

Figure 21:
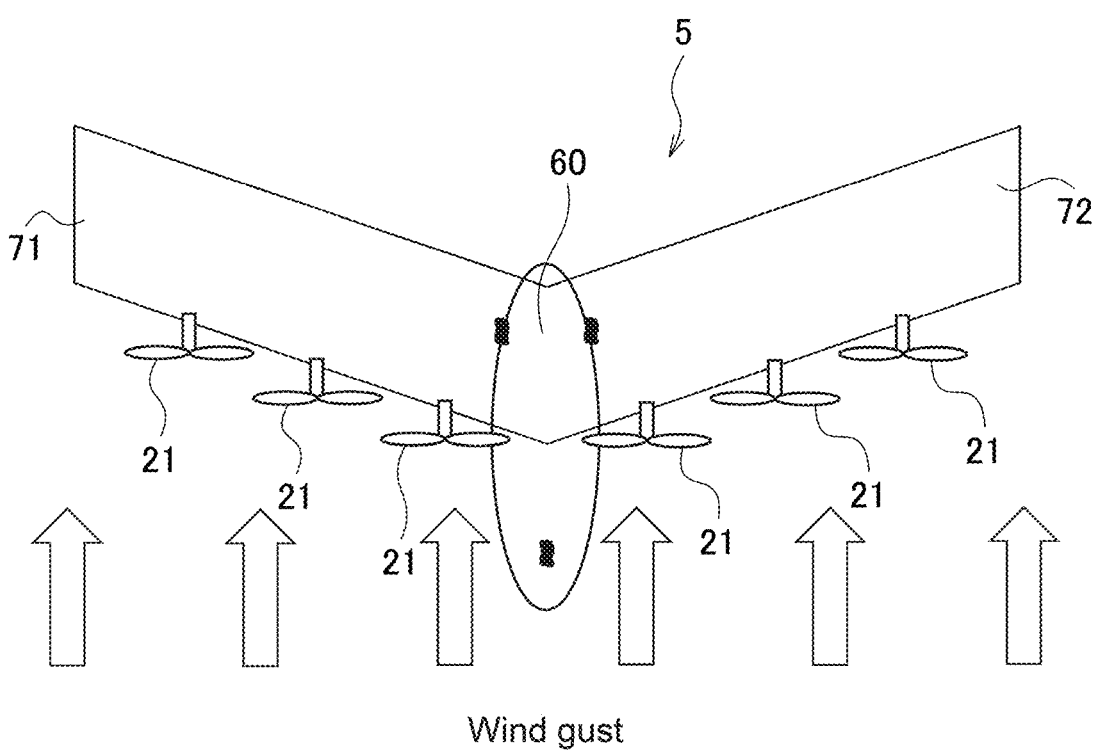
FIG. 21 is a plan view showing a configuration of an electric aircraft according to a fifth embodiment of the present invention.

FIG. 21 is a plan view of an electric aircraft according to a fifth embodiment.

As shown in FIG. 21, an electric aircraft 5 according to the fifth embodiment has a configuration similar to that of the electric aircraft 2 shown in FIGS. 5 and 6. Note that, for simplifying the description, here, three electric propulsion systems are provided on each of the right and left sides. FIG. 21 also shows a state in which the electric aircraft 5 is subjected to the action of wind gust.

As shown in FIG. 21, the main wings 71 and 72 of the electric aircraft 5 during flight obtain a lift Fz by the airflow from the front, but the airspeed of the aircraft is not constantly equal to the ground speed. The influence of wind such as wind gust is superimposed on the ground speed, and the generated lift and a bending moment of the main wings 71 and 72 caused by the lift are also affected by the wind.

Here, when a wind gust acts on the aircraft during steady flight, the airspeed increases suddenly, and thus the lift and the bending moment also increase. Since the aircraft structure receives a load larger than that in the previous flight state, the influence of the wind gust is intended to be reduced by the operation of the existing control surface or the like (see Non-Patent Literature 4).

Figure 22:
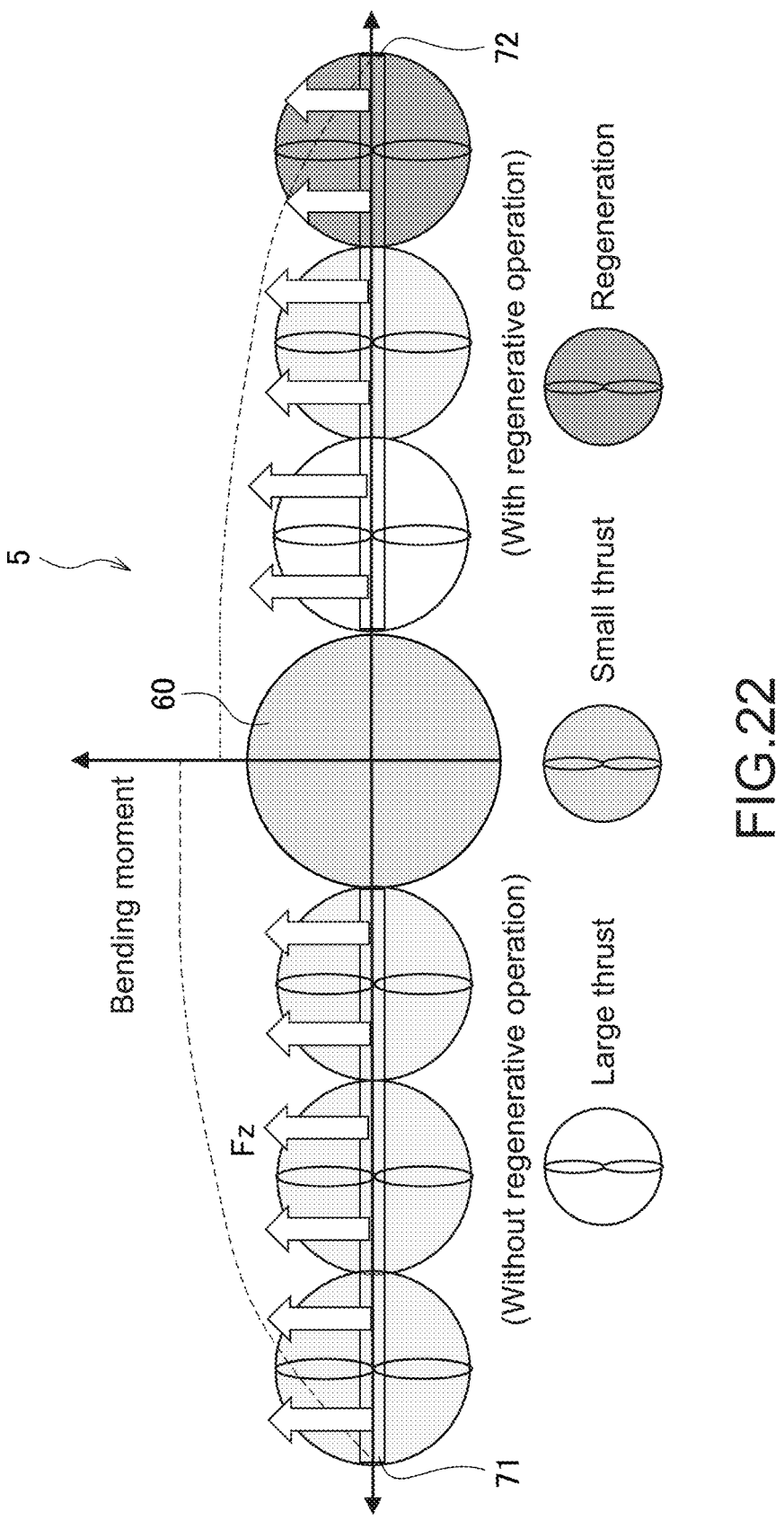
FIG. 22 is a diagram showing the distribution of bending moment acting on the electric aircraft when viewed from the front of the electric aircraft according to the fifth embodiment of the present invention.

In the electric aircraft 5 according to this embodiment, the above-mentioned load is reduced by changing the operating states of the propellers 21 installed at the leading edges of the main wings 71 and 72. On the basis of information of the forward airflow obtained by detection means such as a lidar (sensors 90 in FIG. 6), the controller 30 (see FIG. 6) reduces the thrust of some of the propellers 21 or switches the operating state to the regenerative operation, so that the changes in lift and bending moment can be alleviated as shown in FIG. 22. FIG. 22 is a diagram showing the distribution of the bending moment acting on the electric aircraft when the electric aircraft is viewed from the front. Here, the bending moment distributed in the left main wing 71 shows the case where no regenerative operation is performed, and the bending moment distributed in the right main wing 72 shows the case where a regenerative operation is performed.

Further, the method of estimating the airspeed by using the torque of the propeller 21 estimated from a motor current and a relationship between a torque coefficient and an advance ratio is disclosed in Patent Literature 1.

Figure 23:
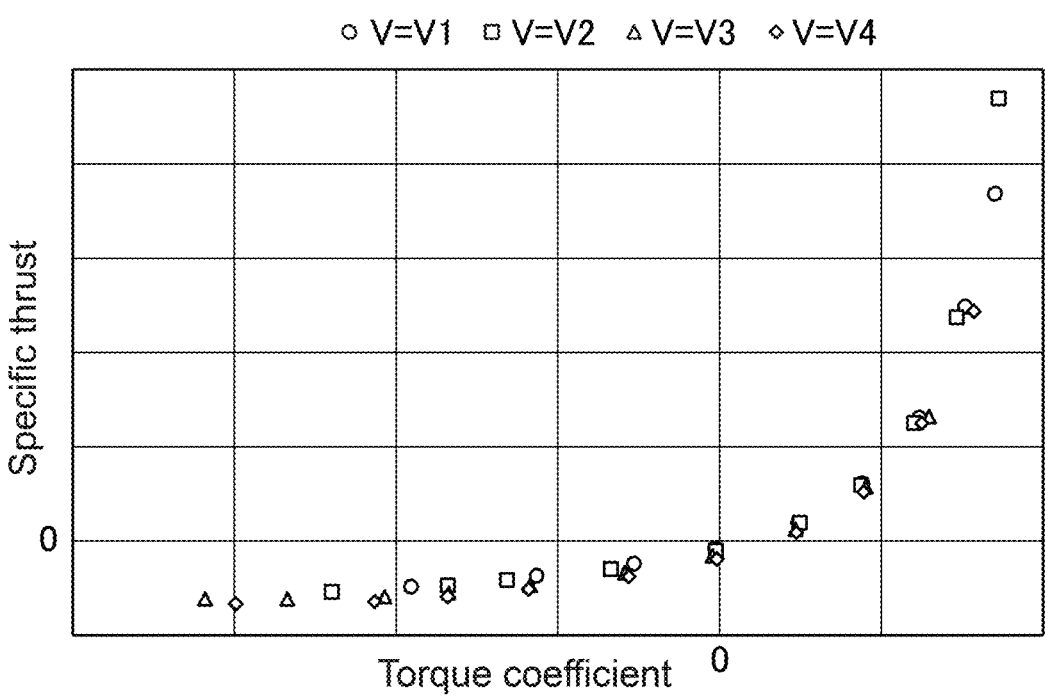
FIG. 23 is a graph showing a relationship between a torque coefficient and the specific thrust according to the fifth embodiment of the present invention.

In the electric aircraft 5 according to this embodiment, the Fz and the bending moment can be adjusted using the relationship between the torque coefficient and the specific thrust shown in FIG. 23 and the relationship shown in FIG. 20, without using the detection means described above. By alleviating the change in load on the aircraft structure by the wind gust or the like as described above, it is possible to reduce strength requirements required for the aircraft structure, that is, reduce the structural weight. Note that V1 to V4 represent airspeeds in FIG. 23.

Sixth Embodiment

Figure 24:
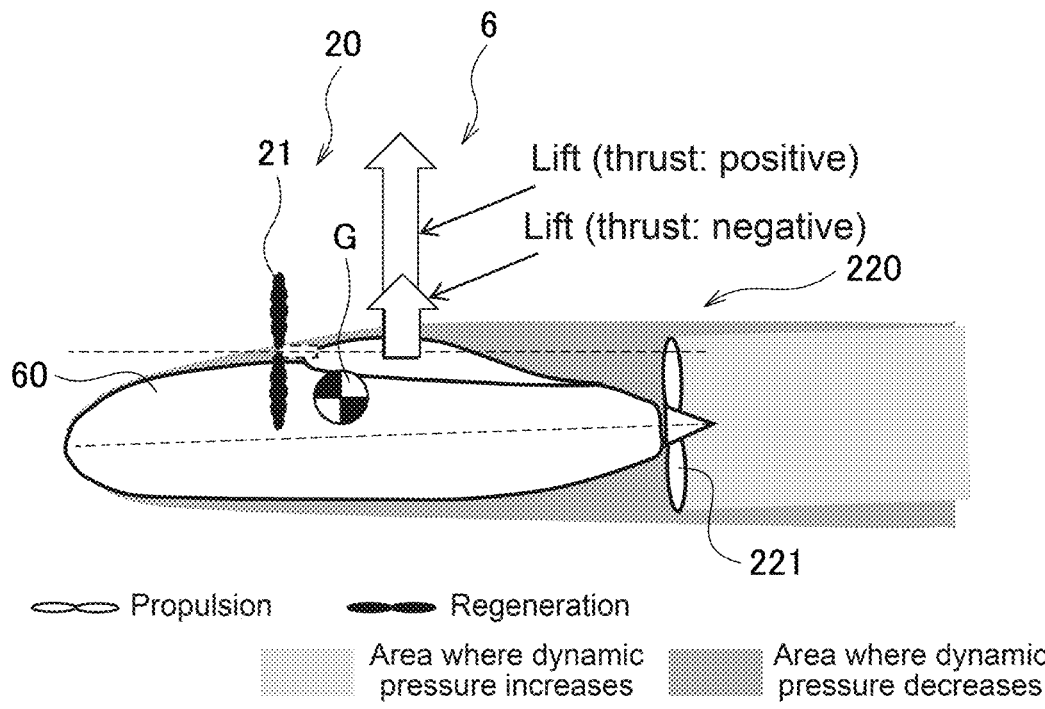
FIG. 24 is a side view showing a configuration of an electric aircraft according to a first aspect of a sixth embodiment of the present invention.
Figures 25, 26:
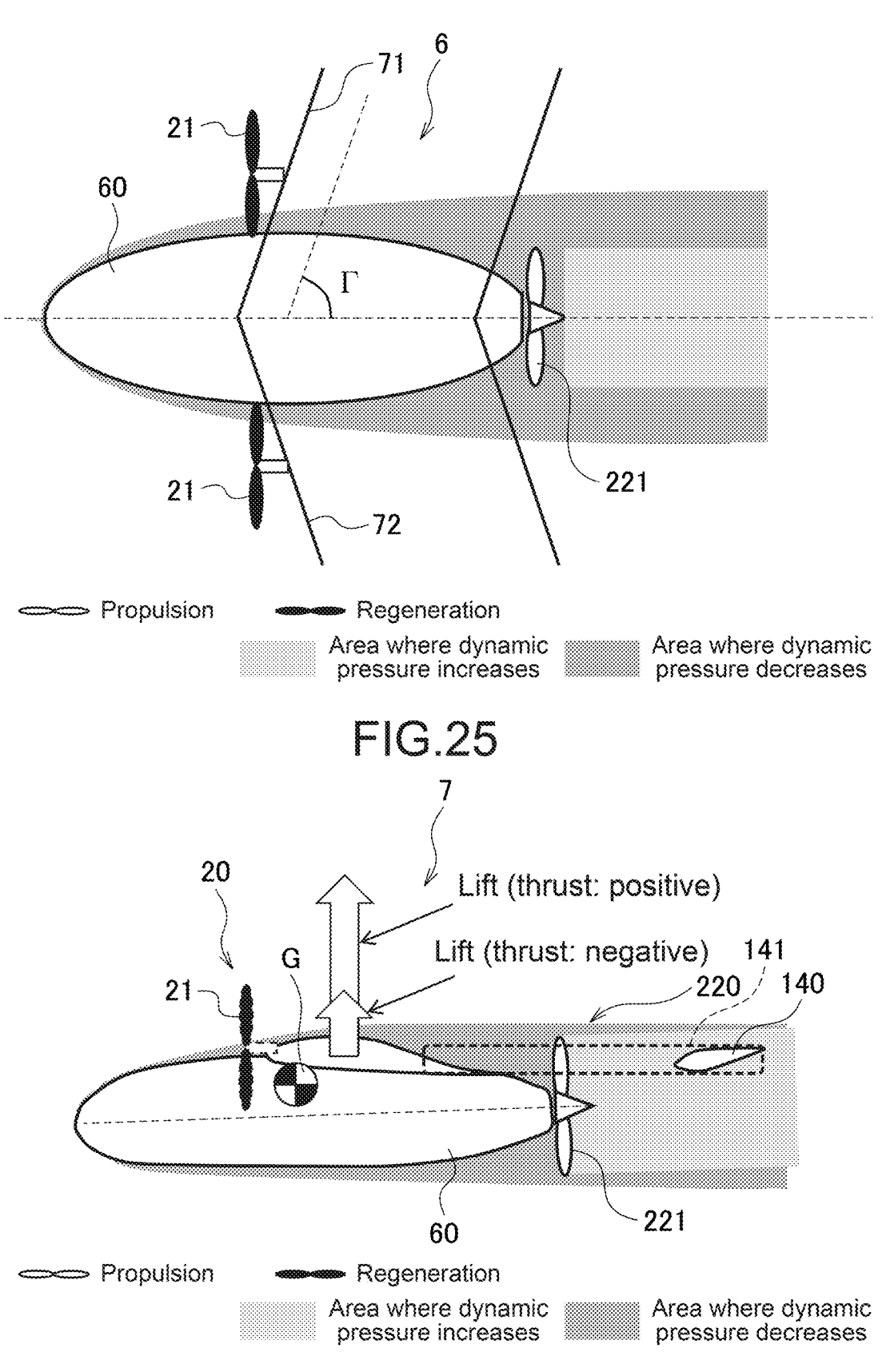
FIG. 25 is a plan view of the electric aircraft shown in FIG. 24.
FIG. 26 is a side view showing a configuration of an electric aircraft according to a second aspect of the sixth embodiment of the present invention.
Figure 28:
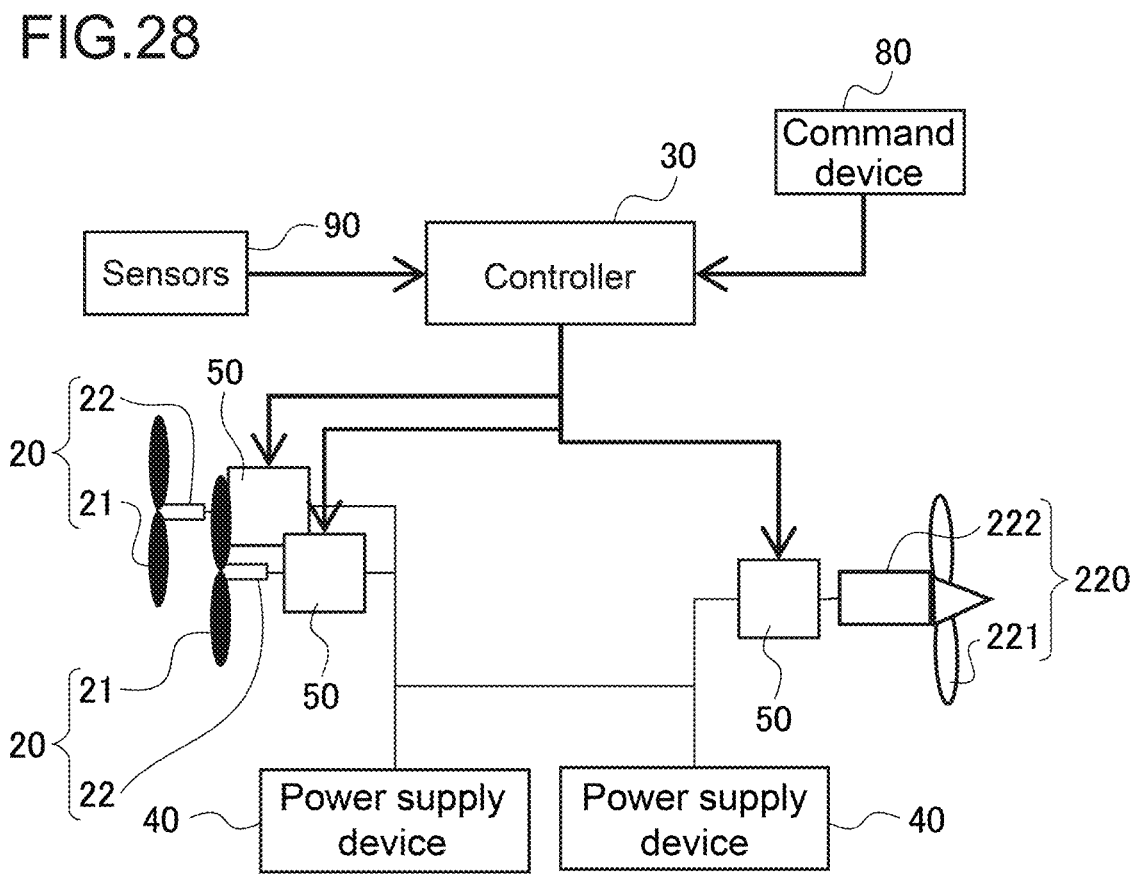
FIG. 28 is a block diagram showing the configuration of the electric aircraft according to the first and second aspects of the sixth embodiment of the invention.

FIG. 24 is a side view showing a configuration of an electric aircraft according to a first aspect of a sixth embodiment, and FIG. 25 is a plan view thereof. FIG. 26 is a side view showing a configuration of an electric aircraft according to a second aspect of the sixth embodiment, and FIG. 25 is a plan view thereof. The difference between the first aspect and the second aspect is that an electric aircraft 6 according to the first aspect does not include a horizontal tail, and an electric aircraft 7 according to the second aspect includes a horizontal tail 140. FIG. 28 is a block showing the configuration of each of the electric aircrafts 6 and 7.

Each of the electric aircrafts 6 and 7 includes electric propulsion systems 20, each of which includes a propeller 21, at the leading edges of a left main wing 71 and a right main wing 72 of a fuselage 60 such that the slipstream of the electric propulsion systems 20 acts on the main wings 71 and 72. Of course, two or more electric propulsion systems 20 may be disposed. Each electric propulsion system 20 includes the propeller 21 and an electric motor 22.

In addition to those configurations, each of the electric aircrafts 6 and 7 includes an electric propulsion system 220. The electric propulsion system 220 includes a propeller 221 and an electric motor 222.

Each of the electric aircrafts 6 and 7 includes a controller 30 that controls the drive of each of the electric motors 22 and 222. The controller 30 performs control according to a command of a command device 80 such as a throttle, a joystick, a rudder pedal, or a wireless operation device. Further, the controller 30 inputs data from sensors 90 such as a gyroscope, an accelerometer, a GPS, and a Pitot tube.

The controller 30 controls each inverter 50 interposed between a power supply device 40 and each of the electric motors 22 and 222 to supply power to each of the electric motors 22 and 222 and to generate a thrust of the propellers 21 and 221 and also to extract wind power serving as power through the propellers 21 and 221. The electric aircrafts 6 and 7 have a function to regenerate or a function to reversely rotate the propellers 21 and 221 by generating electricity by the electric motors 22 and 222.

Here, a horizontal tail, an elevator, and the like are usually used for controlling the aircraft motion in the pitch direction. However, despite the fact that the lift generated by the horizontal tail is much smaller than the lift of the main wing that supports the aircraft, the horizontal tail and the empennage structure of the fuselage that supports the horizontal tail constantly generate drag during flight, which impairs fuel consumption performance.

On the other hand, as shown in FIGS. 24 and 25, a tailless-wing aircraft without tail wings can avoid the above-mentioned problem relating to the fuel consumption performance, but even in the aircraft that flies at a low speed to ensure the static stabilization, it is inevitable to provide the main wing with a sweptback angle Γ. This causes the deterioration of the aerodynamic performance of the main wings 71 and 72 or the increase in structural weight.

The electric aircraft 6 according to the first aspect of the sixth embodiment is configured to generate a larger pitch moment than that in the case where the electric propulsion systems 20 and 220 generate the thrusts with different signs by regeneration or reverse to generate only a positive thrust by providing the plurality of electric propulsion systems 20 and 220 in the directions opposite to each other with respect to the position of the center of gravity, at positions apart from each other in the perpendicular direction (the right and left direction in the figure) with respect to the center of gravity G of the aircraft. For example, if the action point of the lift in the main wings 71 and 72 is behind the center of gravity G of the aircraft, the following special effect can be obtained: a pitch moment is further generated by the change in the lift of the main wings 71 and 72, which results from the increase or decrease in the dynamic pressure of the slipstream of the propellers 21 at the leading edges of the main wings 71 and 72.

Further, in the electric aircrafts 6 and 7 according to the first aspect and the second aspect of the sixth embodiment, the electric propulsion system 220 is installed in an area where the dynamic pressure developed in the slipstream of the aircraft structure is reduced. Thus, the electric propulsion system 220 in the slipstream of the aircraft structure can generate a larger positive thrust with smaller power, and the propulsion efficiency can be improved. In addition thereto, since a large negative thrust (drag) is also generated by regenerating or reversing the electric propulsion systems 20, which are installed at the leading edges of the main wings 71 and 72, in the airflow at a high dynamic pressure, a larger control force (pitch moment) can be obtained from a thrust difference obtained by using the electric propulsion system 220 and the electric propulsion system 20 in combination, and the disadvantages in terms of fuel consumption or structural weight in the horizontal tail 140 and the main wings 71 and 72 can also be avoided.

On the other hand, although the horizontal tail 140 or the like may be required depending on the position of the center of gravity G of the aircraft in the direction of the axis of the aircraft, if the horizontal tail 140 is installed in the slipstream of the aircraft structure, the aerodynamic force to be generated is reduced, and the attitude control function is remarkably deteriorated.

Figure 29:
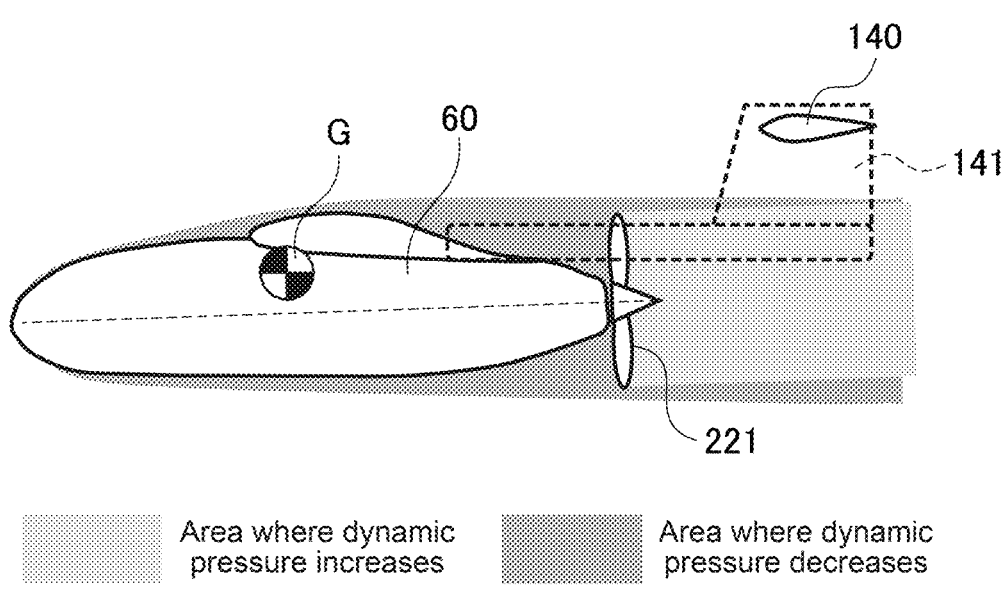
FIG. 29 is a side view showing a comparative configuration example for describing the action according to the sixth embodiment of the invention.

Therefore, in an aircraft such as a UARMS disclosed in Non-Patent Literature 5, in order to install a horizontal tail at a position hardly affected by the slipstream or ensure a moment arm, the horizontal tail 140 is supported by a support portion 141 using the empennage, a vertical tail, or the like of the fuselage 60 as shown in FIG. 29. However, the support portion 141 or the like constantly generates the drag during flight though it is not directly involved in the generation of the lift, which becomes a cause to impair the fuel consumption performance. So, it is desirable to reduce the drag as much as possible.

Figure 27:
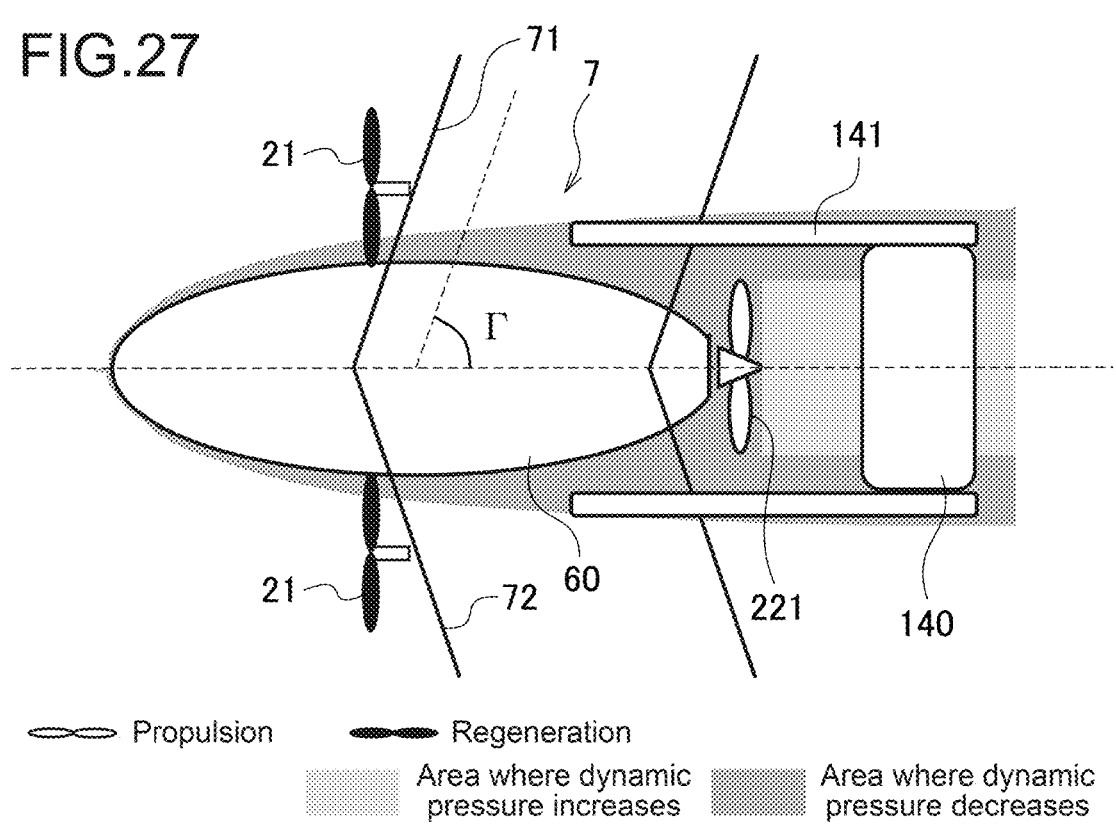
FIG. 27 is a plan view of the electric aircraft shown in FIG. 26.

In this regard, in the electric aircraft 7 according to the second aspect of the sixth embodiment, as shown in FIGS. 26 and 27, the horizontal tail 140 including the support portion 141 is intentionally installed in the slipstream of the fuselage 60 and behind the propeller 221, and the drag generated by the support portion 141 is minimized. Additionally, the propeller 221 is operated in the slipstream of the fuselage, and thus the dynamic pressure higher than the airflow acting on the horizontal tail in a normal aircraft can be caused to act on the horizontal tail 140.

In addition, the slipstream deflected by the fuselage 60 can be effectively caused to act on the horizontal tail 140 by the propeller 221, and since the propeller 221 is in the slipstream of the fuselage 60, the dynamic pressure acting on the horizontal tail 140 can be reduced with less power when the propeller 221 is reversed. In such a manner, it is possible to greatly change the dynamic pressure acting on the horizontal tail 140 with less power, that is, to save energy at the time of pitch control as well and also to change the pitch moment without providing a movable part such as an elevator.

Figure 30:
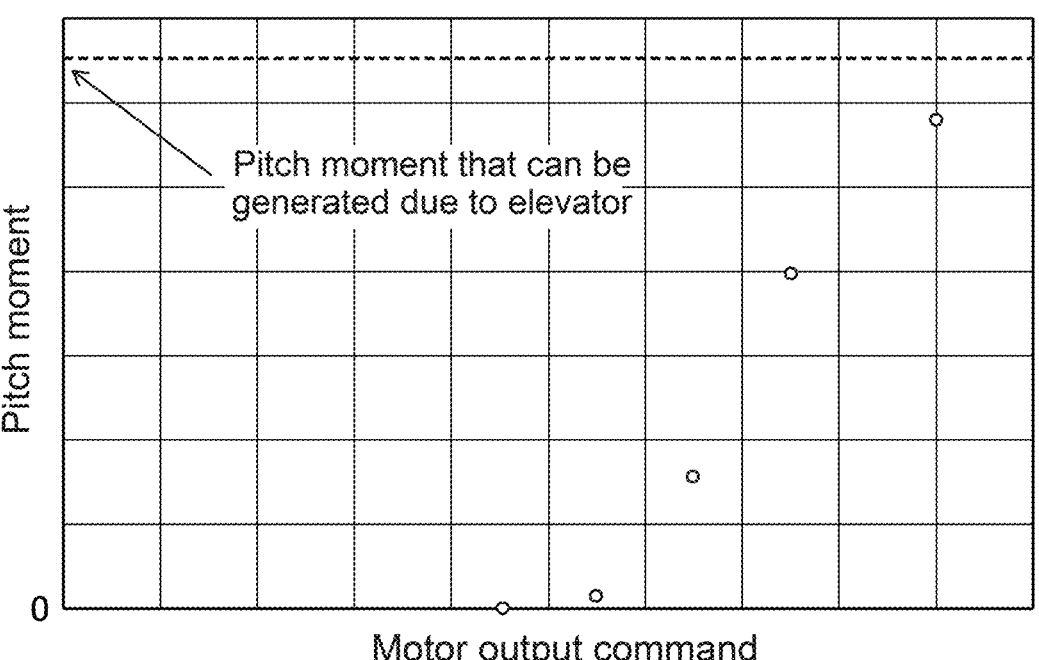
FIG. 30 is a graph showing a relationship between a motor output command and pitch moment according to the sixth embodiment of the invention.
Figure 31:
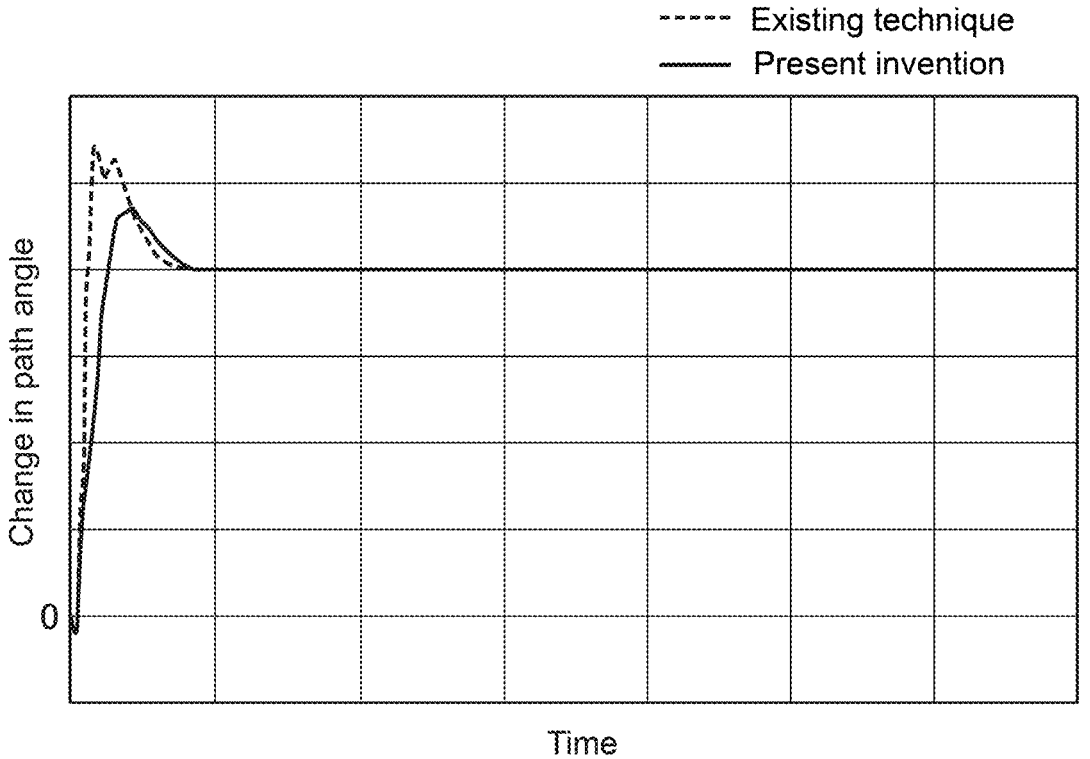
FIG. 31 is a graph showing a change in path angle according to the sixth embodiment of the invention as compared with a conventional technique.

As shown in FIGS. 30 and 31, in the electric aircrafts 6 and 7 according to the first and second aspects of the sixth embodiment, the same degree of the pitch moment as that of the elevator can be generated only by a horizontal stabilizer without elevator, and the command of the path angle can be followed. Thus, in addition to the above-mentioned merits relating to the fuel consumption performance, it is possible to obtain the following special effect: reliability can be improved by omitting the elevator serving as a movable part from the existing control surface and the horizontal tail.

Further, the position of the thrust axis of the propeller 221 with respect to the center of gravity G of the aircraft is caused to coincide with the direction of the lift generated by the horizontal tail 140, and thus the pitch moment caused by the thrust of the propeller 221 is superimposed on the pitch moment generated by the horizontal tail 140, so that it is possible to obtain a higher attitude control function. Furthermore, since the thrust axis of the propeller 221 is in the direction (suction surface side) closer to the lift generated by the horizontal tail 140 than the horizontal tail 140, and thus a larger aerodynamic force can be generated by the higher dynamic pressure on the suction surface side.

CONCLUSION

As described above, according to the present invention, it is possible to generate the aerodynamic force in just proportions without impairing the fuel consumption performance. In addition, it is possible to dramatically improve the safety by automating the operation (Fly-by-Wire) of small aircraft, which has a much higher accident rate than that of passenger aircraft while being regarded as a new major market as typified by flying cars in the future. Its possibility of industrial use is extremely high. Furthermore, it is effective to reduce the aircraft costs of the passenger aircraft equipped with expensive attitude control systems.

OTHERS

Although the embodiments of the present invention have been described above, the present invention is not limited to the embodiments described above, and various modifications may be made thereto.

For example, in the embodiments described above, the electric aircraft includes the propeller for propulsion, but fans for propulsion may be used instead of the propeller for propulsion.

Further, the controller may be configured to learn, as training data, one or more of the rotation speed, the output, the thrust, or the pitch angle of the propeller, the motor torque of the electric motor, the lift of the wing, or processing information thereof, and to output the rotation speed of a first propeller, the motor output or motor torque of a first electric motor, or processing information thereof. Such control may be performed for any propeller or electric motor of the embodiments described above. For the learning described above, typically, known techniques of machine learning can be widely used. In particular, a neural network, Bayesian inference, regression tree, or ensemble learning using a combination thereof can be suitably used. The prediction accuracy can be further improved by using the ensemble learning in which the results of learning obtained by a plurality of techniques including the regression tree are combined.

US 12,654,869 B2

REFERENCE SIGNS LIST 1 to 7 electric aircraft
10 wing
11 aerodynamic force
20, 120, 220 electric propulsion system
21, 121, 221 propeller
22, 122, 222 electric motor
30 controller
71 main wing
72 main wing
120 electric propulsion system
121 propeller
122 electric motor
140 horizontal tail
221 propeller
222 electric motor
A main wing propeller
B wing tip propeller
C on-axis propeller
Fz lift
G center of gravity of aircraft

The invention claimed is:

1. An electric aircraft, comprising:
a first electric propulsion system including
   a first propeller or fan for propulsion, and
   a first electric motor that drives the first propeller or fan, the first electric propulsion system being disposed at a front of a wing to contribute to a lift of the wing; and
a controller configured to adjust a thrust of the first electric propulsion system to a negative value, reduce a slipstream of the first propeller or fan by regenerating or reversely rotating the first electric propulsion system, reduce a dynamic pressure acting on the wing, and increase a change range of a difference between a first aerodynamic force necessary for flight and a second aerodynamic force changed according to an operating state of the first electric propulsion system, to increase a control force of a longitudinal motion of the aircraft, the control force depending on the change range.

2. The electric aircraft according to claim 1, comprising main wings provided as the wing on right and left with respect to an axis of the aircraft, wherein
one or two or more of the first electric propulsion system are disposed at a front of each of the main wings to contribute to a lift of each of the main wings, and
the controller
   adjusts the thrust of the first electric propulsion system disposed on one of the right and left main wings to a positive value and the thrust of the first electric propulsion system disposed on the other one of the right and left main wings to a negative value, or
   adjusts the thrust of the first electric propulsion system disposed on each of the right and left main wings to a negative value.

3. The electric aircraft according to claim 1, comprising main wings provided as the wing on right and left with respect to an axis of the aircraft, wherein
two or more of the first electric propulsion system are disposed at a front of each of the main wings to contribute to a lift of each of the main wings, and
the controller adjusts the thrusts of the two or more of the first electric propulsion system disposed on at least one of the right and left main wings to positive or negative values opposite to each other.

4. The electric aircraft according to claim 2, further comprising
a second electric propulsion system disposed at a rear of each of the right and left main wings and at a position on which a slipstream of the first propeller or fan acts, the second electric propulsion system including
   a second propeller or fan, and
   a second electric motor that drives each of the second propellers or fans.

5. The electric aircraft according to claim 4, wherein the controller rotates each of the second propellers or fans in a direction such that an effect of a tip vortex of each of the main wings is mitigated, and adjusts an operating state of the second electric propulsion system in response to an operating state of the first electric propulsion system.

6. The electric aircraft according to claim 1, comprising one or two or more electric propulsion systems including the first electric propulsion system disposed at a front of the wing to contribute to a lift of the wing, wherein the controller adjusts the electric propulsion system such that a relationship between a variable relating to an operating state of the electric propulsion system and an aerodynamic force generated on the wing maintains a linear range.

7. The electric aircraft according to claim 1, wherein when a variable relating to an operating state of the first electric propulsion system or an airflow state changes, the controller adjusts the electric propulsion system on a basis of a relationship between the variable relating to the operating state of the electric propulsion system and an aerodynamic force generated on the wing such that a total thrust of the electric propulsion systems or the aerodynamic force has a predetermined value or falls within a predetermined range.

8. The electric aircraft according to claim 1, comprising a storage device that stores a data group of a relationship between a variable relating to an operating state of the first electric propulsion system and an aerodynamic force generated on a wing, wherein
the controller adjusts the first electric propulsion system on a basis of the relationship between the variable relating to the operating state of the first electric propulsion system and the aerodynamic force generated on the wing.

9. The electric aircraft according to claim 1, wherein the controller
   learns, as training data, one or more of a rotation speed, an output, a thrust, or a pitch angle of the first propeller, a motor torque of the first electric motor, a lift of a wing, or processing information thereof,
   obtains a relationship between a variable relating to an operating state of the first electric propulsion system and an aerodynamic force generated on the wing from information relating to the rotation speed of the first propeller, a motor output or the motor torque of the first electric motor, or the processing information thereof, and
   adjusts the electric propulsion system on a basis of the obtained information.

10. The electric aircraft according to claim 1, comprising:
main wings provided as the wing on right and left with respect to an axis of the aircraft; and
a third electric propulsion system disposed in a slipstream of an aircraft structure, the third electric propulsion system including
   a third propeller or fan, and a third electric motor that drives the third propeller or fan, wherein the first electric propulsion system is disposed at a front of each of the main wings to contribute to a lift of each of the main wings, and a thrust axis of the first electric propulsion system and a thrust axis of the third electric propulsion system are opposite to each other in a perpendicular direction with respect to the center of gravity of the aircraft.

11. The electric aircraft according to claim 10, further comprising a tail wing disposed at a position on which the slipstream of the third propeller or fan acts.

12. The electric aircraft according to claim 11, wherein a position of a thrust axis of the third propeller or fan in the perpendicular direction with respect to the center of gravity of the aircraft is in a direction identical to a direction of the lift generated by the tail wing.

13. The electric aircraft according to claim 12, wherein the thrust axis of the third propeller or fan is in a direction closer to the lift generated by the tail wing than the tail wing.

14. An attitude control method for an electric aircraft, comprising:

adjusting a thrust of a first electric propulsion system to a negative value, the first electric propulsion system including a first propeller or fan for propulsion and a first electric motor that drives the first propeller or fan, the first electric propulsion system being disposed at a front of a wing to contribute to a lift of the wing;

reducing a slipstream of the first propeller or fan by regenerating or reversely rotating the first electric propulsion system;

reducing a dynamic pressure acting on the wing; and increasing a change range of a difference between a first aerodynamic force necessary for flight and a second aerodynamic force changed according to an operating state of the first electric propulsion system, to increase a control force of a longitudinal motion of the aircraft, the control force depending on the change range.

* * * * *